United States Patent
Tian et al.

(10) Patent No.: US 10,599,903 B2
(45) Date of Patent: Mar. 24, 2020

(54) INFORMATION PROCESSING METHOD AND ELECTRONIC DEVICE

(71) Applicant: Lenovo (Beijing) Limited, Beijing (CN)

(72) Inventors: Jiangtong Tian, Beijing (CN); Jiacheng Liu, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 42 days.

(21) Appl. No.: 14/859,843

(22) Filed: Sep. 21, 2015

(65) Prior Publication Data

US 2016/0378317 A1   Dec. 29, 2016

(30) Foreign Application Priority Data

Jun. 26, 2015   (CN) .......................... 2015 1 0364536
Jun. 29, 2015   (CN) .......................... 2015 1 0369773
Jun. 29, 2015   (CN) .......................... 2015 1 0370115

(51) Int. Cl.
*G06K 9/00* (2006.01)
*G06F 3/0488* (2013.01)

(52) U.S. Cl.
CPC ..... *G06K 9/00013* (2013.01); *G06F 3/04883* (2013.01); *G06K 9/00067* (2013.01)

(58) Field of Classification Search
CPC ............ G06F 3/04847; G06F 3/04883; G06K 9/00013; G06K 9/00067
See application file for complete search history.

(56) References Cited

U.S. PATENT DOCUMENTS

| | | | |
|---|---|---|---|
| 8,581,842 B2 | 11/2013 | Grover et al. | |
| 8,760,429 B2 | 6/2014 | Michaelis et al. | |
| 2008/0036743 A1 | 2/2008 | Westerman et al. | |
| 2009/0160793 A1* | 6/2009 | Rekimoto | G06F 3/0414 345/173 |

(Continued)

FOREIGN PATENT DOCUMENTS

| | | |
|---|---|---|
| CN | 101349944 A | 1/2009 |
| CN | 101387941 A | 3/2009 |

(Continued)

OTHER PUBLICATIONS

"German Application Serial No. 102015116477.9, Office Action dated Feb. 11, 2016", w/ English Translation, 10 pgs.

(Continued)

*Primary Examiner* — Charles V Hicks
(74) *Attorney, Agent, or Firm* — Schwegman Lundberg & Woessner, P.A.

(57) ABSTRACT

The disclosure provides an information processing method and an electronic device. The information processing method comprises: detecting, via a sensing region of an electronic device, a first input operation performed by an operating body on a surface of a button of the electronic device, wherein the sensing region overlaps the surface of the button; comparing the first input operation with at least two predetermined operations in a preset database; when the first input operation matches a first predetermined operation, determining a first control instruction corresponding to the first input operation; and performing a corresponding operation in response to the first control instruction.

18 Claims, 7 Drawing Sheets

(56) References Cited

U.S. PATENT DOCUMENTS

| | | | | |
|---|---|---|---|---|
| 2014/0204029 | A1* | 7/2014 | Lopez | G06F 3/013 345/163 |
| 2015/0047017 | A1* | 2/2015 | Kim | G06F 21/32 726/19 |
| 2015/0100911 | A1* | 4/2015 | Yin | G06F 3/04883 715/773 |
| 2015/0169169 | A1* | 6/2015 | Andersson | G06F 3/0488 715/765 |
| 2016/0205748 | A1* | 7/2016 | Lashina | H05B 33/0851 315/130 |
| 2016/0350580 | A1* | 12/2016 | Pyun | G06K 9/00073 |

FOREIGN PATENT DOCUMENTS

| | | |
|---|---|---|
| CN | 101615076 A | 12/2009 |
| CN | 101866226 A | 10/2010 |
| CN | 201804304 U | 4/2011 |
| CN | 102129329 A | 7/2011 |
| CN | 102880410 A | 1/2013 |
| CN | 103294347 A | 9/2013 |
| CN | 103902183 A | 7/2014 |
| CN | 103997669 A | 8/2014 |
| CN | 104423557 A | 3/2015 |
| CN | 104182040 A | 12/2017 |
| EP | 2730996 A2 | 5/2014 |

OTHER PUBLICATIONS

"Chinese Application No. 201510364536.6, Office Action dated Aug. 23, 2017", w/ English Translation, (dated Aug. 23, 2017), 17 pgs.

"Chinese Application No. 201510369773.1, Office Action dated Jul. 21, 2017", w/ English Translation, (dated Jul. 21, 2017), 14 pgs.

"Chinese Application No. 201510369773.1, Office Action dated Dec. 26, 2016", w/ English Translation, (dated Dec. 26, 2016), 11 pgs.

"Chinese Application No. 201510370115.4, Office Action dated Jul. 31, 2017", w/ English Translation, (dated Jul. 31, 2017), 15 pgs.

"Chinese Application No. 201510370115.4, Office Action dated Dec. 23, 2016", w/ English Translation, (dated Dec. 23, 2016), 14 pgs.

"Chinese Application No. 201510369773.1, Office Action dated May 29, 2018", w/ English Translation, (dated May 29, 2018), 8 pgs.

"Chinese Application Serial No. 201510370115.4, Office Action dated Jul. 1, 2019", w/ English Translation, (dated Jul. 1, 2019), 18 pgs.

* cited by examiner

INFORMATION PROCESSING METHOD AND ELECTRONIC DEVICE

CROSS-REFERENCE TO RELATED APPLICATION(S)

This application claims priority to the Chinese Patent Application No. 201510364536.6, filed on Jun. 26, 2015, entitled "INFORMATION PROCESSING METHOD AND ELECTRONIC DEVICE" which is incorporated herein by reference in its entirety.

This application claims priority to the Chinese Patent Application No. 201510369773.1, filed on Jun. 29, 2015, entitled "INFORMATION PROCESSING METHOD AND ELECTRONIC DEVICE" which is incorporated herein by reference in its entirety.

This application claims priority to the Chinese Patent Application No. 201510370115.4, filed on Jun. 29, 2015, entitled "INFORMATION PROCESSING METHOD AND ELECTRONIC DEVICE" which is incorporated herein by reference in its entirety.

TECHNICAL FIELD

The disclosure generally relates to electronic technology, and more particularly, to an information processing method and an electronic device.

BACKGROUND

With the development of electronic technology and the increase of customer demands, more and more electronic devices (e.g., smart phones, tablet computers) emerge. These electronic devices bring great convenience to people's life and work.

These electronic devices are typically provided with touch display screens for responding to users' touch operations and realizing functions corresponding to the touch operations. Generally, in such electronic devices, some common gestures are configured to correspond to normal functions in the electronic devices. For example, a zoom gesture corresponds to a zoom function, a sliding gesture corresponds to a page flipping function, a long-press gesture corresponds to a selecting function, etc. As the number of functions in the electronic devices increases, more and more gestures are defined. To trigger a certain function of an electronic device, a user often needs to perform multiple operations with respect to the electronic device. For example, to trigger an electronic device to perform a function of switching among applications, a user needs to double click the home button to enter a multi-task interface which displays multiple applications running in the background. Then, the user needs to scroll the page corresponding to the multi-task interface to find an application to be started. When he determines to start a certain application, the user clicks the task window corresponding to the application. Only after receiving the click operation from the user, the electronic device can run the application selected by the user. Hence, conventional technology suffers from the following technical problem: triggering of an electronic device to start a corresponding function requires complicated operations and is not smart enough.

SUMMARY

Embodiments of the disclosure provide an information processing method and an electronic device.

In an aspect, an embodiment of the disclosure provides an information processing method, comprising:

detecting, via a sensing region of an electronic device, a first input operation performed by an operating body on a surface of a button of the electronic device;

comparing the first input operation with at least two predetermined operations in a preset database;

if the first input operation matches a first predetermined operation, determining a first control instruction corresponding to the first input operation; and performing a corresponding operation in response to the first control instruction.

According to an embodiment, the detecting, via the sensing region, the first input operation on the surface of the button comprises:

acquiring, via the button, M pieces of texture information generated by the operating body on the sensing region when the operating body is in contact with the surface of the button, M being an integer greater than or equal to 2;

determining, based on the M pieces of texture information, a changing trend of the M pieces of texture information, wherein the changing trend indicates a change of operation in a first process of an input operation performed by the operating body on a contact surface; and determining the first input operation based on the changing trend.

According to an embodiment, the determining based on the M pieces of texture information the changing trend of the M pieces of texture information comprises:

extracting feature points for each of the M pieces of texture information, wherein the feature points for said each of the M pieces of texture information are different from each other;

determining an area value for said each of the M pieces of texture information corresponding to the feature points;

determining the changing trend, based on a change of the area value for said each of the M pieces of texture information in the first process.

According to an embodiment, if the first input operation determined based on the changing trend matches a sliding operation in a first direction in the preset database, said performing the corresponding operation in response to the first control instruction comprises: determining a switch instruction corresponding to the sliding operation in the first direction; and controlling, in response to the switch instruction, a display screen of the electronic device to switch from a first interface corresponding to a running state of a first application to a second interface corresponding to a running state of a second application.

According to an embodiment, the second application is an application being invoked by the electronic device before the first application is in a running state.

According to an embodiment, the method further comprises: after performing the corresponding operation in response to the first control instruction, detecting a second input operation through the sensing region of the electronic device;

generating a return instruction for controlling the display screen to switch from the second interface to the first interface, if the second input operation is different from the first input operation; and generating a switch instruction for controlling the display screen to switch from the second interface to a third interface which is corresponding to a running state of a third application, if the second input operation is the same as the first input operation.

According to an embodiment, if the first input operation matches a sliding operation in the preset database, said performing the corresponding operation in response to the first control instruction comprises:

obtaining a related parameter of the display screen of the electronic device;

adjusting the related parameter of the display screen, based on the first input operation, to obtain an adjusted parameter; and controlling the display screen to display the content based on the adjusted parameter.

According to an embodiment, the obtaining the related parameter of the display screen of the electronic device comprises:

obtaining an ambient brightness parameter of an environment where the display screen is located;

said adjusting the related parameter of the display screen based on the first input operation comprises:

increasing a display brightness value of the display screen to a first brightness value, if the first input operation is a sliding operation in a first direction, the ambient brightness parameter is greater than a first ambient brightness threshold and the display brightness value of the display screen is less than a first display brightness threshold, or increasing a display brightness value of the display screen to a second brightness value, if the first input operation is a sliding operation in a first direction; and decreasing the display brightness value of the display screen to a third brightness value, if the first input operation is a sliding operation in a second direction.

According to an embodiment, the obtaining the related parameter of the display screen of the electronic device comprises: obtaining a display parameter for a display object displayed on the display screen, wherein the display object includes text, and the display parameter includes a text color of the text, and the adjusting the related parameter of the display screen based on the first input operation to obtain the adjusted parameter comprises: if the first input operation is a sliding operation in a first direction, adjusting the text color to a first text color.

According to an embodiment, the obtaining the related parameter of the display screen of the electronic device comprises: obtaining a display parameter for a display object displayed on the display screen, wherein the display object includes a background image and text, and the display parameter includes a background color of the background image and a text color of the text, the adjusting the related parameter of the display screen based on the first input operation to obtain the adjusted parameter comprises:

calculating a color difference between the text color and the background color;

adjusting the text color to a first text color, if the first input operation is a sliding operation in a first direction and the color difference is less than a color difference threshold, or adjusting the background color to a first background color when the first input operation is a sliding operation in the first direction and the color difference is less than a color difference threshold.

According to an embodiment, if the first input operation matches a tapping operation in the preset database according to the changing trend, said performing the corresponding operation in response to the first control instruction comprises:

determining a go-back instruction corresponding to the tapping operation; and controlling, in response to the go-back instruction, a display screen of the electronic device to switch from a fourth interface corresponding to a running state of a first application to a fifth interface corresponding to a running state of the first application, wherein the fifth interface is an upper level interface of the fourth interface.

According to an embodiment, the changing trend indicates a change of an operation force applied with respect to the contact surface in a process of an input operation performed by the operating body at a first position of the contact surface, and zooming in or zooming out an image displayed on the display screen, in response to an increase or a decrease of the operation force.

According to another aspect of the disclosure, there is provided an electronic device, comprising:

a housing;

a button arranged at a first position on the housing and having a sensing region arranged on a surface, the sensing region being configured to detect a first input operation performed by an operating body on the surface of the button;

a storage unit storing executable instructions;

a processor coupled to the storage unit to execute the instructions, the processor being configured to:

compare the first input operation with at least two predetermined operations in a preset database;

if the first input operation matches a first predetermined operation, determine a first control instruction corresponding to the first input operation; and perform a corresponding operation in response to the first control instruction.

According to an embodiment, the button is configured to:

acquire M pieces of texture information generated by the operating body on the sensing region when the operating body is in contact with the surface of the button, M being an integer greater than or equal to 2, and the processor is configured to: determine, based on the M pieces of texture information, a changing trend of the M pieces of texture information, which indicates a change of operation in a first process of the operating body performing an input operation on a contact surface; and determine the first input operation based on the changing trend.

According to an embodiment, the processor is configured to:

extract feature points for each of the M pieces of texture information, wherein the feature points for said each of the M pieces of texture information are different from each other;

determine an area value for said each of the M pieces of texture information corresponding to the feature points;

determine the changing trend, based on a change of the area value for said each of the M pieces of texture information in the first process.

According to an embodiment, the processor is further configured to:

if the first input operation matches a sliding operation in a first direction in the preset database, determine a switch instruction corresponding to the sliding operation in the first direction, and control, in response to the switch instruction, a display screen of the electronic device to switch from a first interface corresponding to a running state of a first application to a second interface corresponding to a running state of a second application.

According to an embodiment, the second application is an application being invoked by the electronic device before the first application is in a running state.

According to an embodiment, the at least one processor is further configured to:

detect a second input operation through the sensing region of the electronic device;

generate a return instruction for controlling the display screen to switch from the second interface to the first interface, if the second input operation is different from the first input operation; and generate a switch instruction for controlling the display screen to switch from the second interface to a third interface which is corresponding to a running state of a third application, if the second input operation is the same as the first input operation.

According to an embodiment, if the first input operation matches a sliding operation in the preset database, the processor is further configured to:

in response to the first control instruction, obtain a related parameter of the display screen of the electronic device;

adjust the related parameter of the display screen, based on the first input operation, to obtain an adjusted parameter, and control the display screen to display the content based on the adjusted parameter.

According to an embodiment, the processor is further configured to:

obtain an ambient brightness parameter of an environment where the display screen is located;

increase a display brightness of the display screen to a first display brightness if the first input operation is a sliding operation in a first direction, the ambient brightness parameter is greater than a first ambient brightness threshold and the display brightness value of the display screen is less than a first display brightness threshold, or increase a display brightness value of the display screen to a second brightness value, if the first input operation is a sliding operation in a first direction; and decreasing the display brightness value of the display screen to a third brightness value, if the first input operation is a sliding operation in a second direction.

According to an embodiment, the processor is further configured to:

obtain a display parameter for a display object displayed on the display screen, wherein the display object includes text and the display parameter includes a text color of the text, and if the first input operation is a sliding operation in a first direction, adjust the text color to a first text color.

According to an embodiment, the processor is further configured to:

obtain a display parameter for a display object displayed on the display screen, wherein the display object includes a background image and text, and the display parameter includes a background color of the background image and a text color of the text, and calculate a color difference between the text color and the background color; when the first input operation is a sliding operation in a first direction and the color difference is less than a color difference threshold, adjust the text color to a first text color; or if the first input operation is a sliding operation in the first direction and the color difference is less than a color difference threshold, adjust the background color to a first background color.

According to an embodiment, the processor is further configured to:

if the first input operation matches a tapping operation in the preset database according to the changing trend, determine a go-back instruction corresponding to the tapping operation; and control, in response to the go-back instruction, a display screen of the electronic device to switch from a fourth interface corresponding to a running state of a first application to a fifth interface corresponding to a running state of the first application, wherein the fifth interface is an upper level interface of the fourth interface.

According to an embodiment, the changing trend indicates a change of an operation force applied with respect to the contact surface in a process of an input operation performed by the operating body at a first position of the contact surface, and the processor is further configured to: zoom in or zoom out an image displayed on the display screen, in response to an increase or a decrease of the operation force.

According to a technical solution of an embodiment of the disclosure, a first input operation performed by an operating body on a surface of a button of an electronic device is detected via a sensing region of the electronic device; the first input operation is compared with at least two predetermined operations in a preset database; when the first input operation matches a first predetermined operation, a first control instruction corresponding to the first predetermined operation is determined; and a corresponding operation is performed in response to the first control instruction. As such, an electronic device, provided with a single button which is associated with at least one corresponding function of the electronic device, can respond to a preset operation which is generated by the operating body on the button and perform an instruction corresponding to the operation so as to start the function corresponding to the operation. Thus, when triggering the electronic device to start a function, a user only needs to perform a preset operation on the button, instead of having to perform multiple complicated operations. Accordingly, it is achievable to start a corresponding function of the electronic device in a simple and smart operating manner.

BRIEF DESCRIPTION OF THE DRAWINGS

In order to more clearly illustrate technical solutions according to embodiments of the present disclosure, drawings to be used in the description of the embodiments are briefly introduced in the following. Obviously, the drawings in the following description only relate to some embodiments of the disclosure.

DETAILED DESCRIPTION OF EMBODIMENTS

An embodiment of the disclosure provides an information processing method, comprising:

detecting, via a sensing region of an electronic device, a first input operation performed by an operating body on a surface of a button of the electronic device;

comparing the first input operation with at least two predetermined operations in a preset database;

when the first input operation matches a first predetermined operation, determining a first control instruction corresponding to the first input operation; and performing a corresponding operation in response to the first control instruction.

According to the technical solution of the embodiment of the disclosure, the first input operation performed by the operating body on the surface of the button of the electronic device is detected via the sensing region of the electronic device; the first input operation is compared with at least two predetermined operations in the preset database; when the first input operation matches the first predetermined operation, the first control instruction corresponding to the first predetermined operation is determined; and the corresponding operation is performed in response to the first control instruction. As such, the electronic device, provided with the single button which is associated with at least one corresponding function of the electronic device, can respond to a preset operation which is generated by the operating body on the button and perform an instruction corresponding to the operation so as to start the function corresponding to the operation. Thus, when triggering the electronic device to start a function, a user only needs to perform a preset operation on the button. Accordingly, it is achievable to start a corresponding function of the electronic device in a simple and smart operating manner.

In the following, main principles, detailed implementations and advantages of technical solutions according to embodiments of the disclosure will be explained in detail in conjunction with the drawings.

First Embodiment

In detailed implementation, the information processing method is applicable to an electronic device. The electronic device may be an electronic device with a display screen (such as a handset, a tablet computer, a notebook computer, etc.) or some other electronic devices which are not enumerated here.

Figure 1:
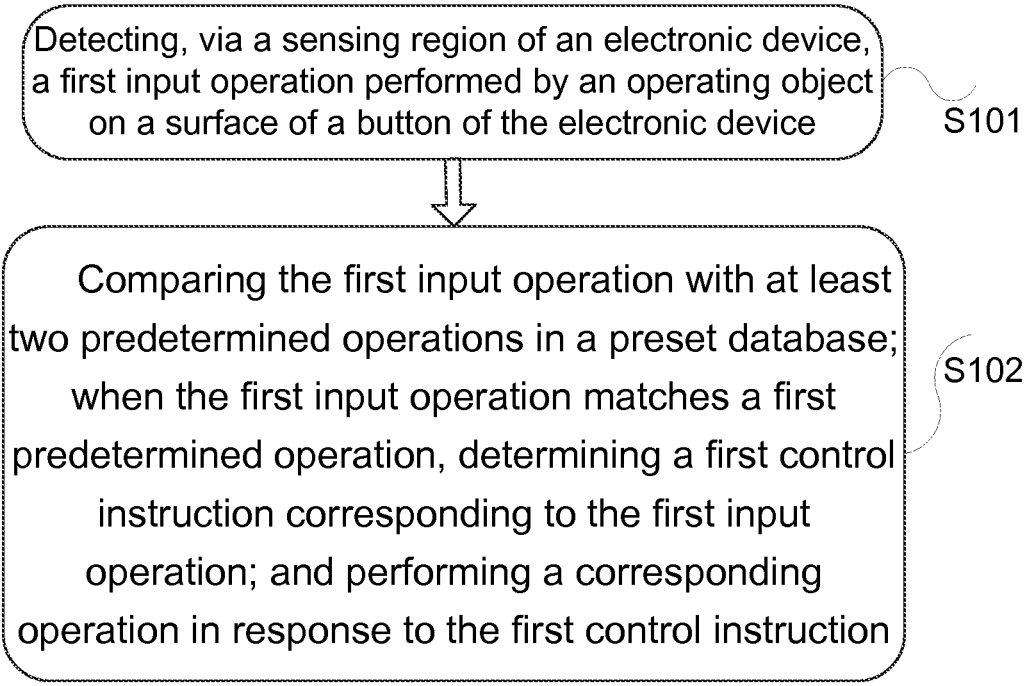
FIG. 1 is a flowchart of an information processing method according to a first embodiment of the disclosure.

Referring to FIG. 1, the embodiment provides an information processing method, comprising:

at step S101, detecting, via a sensing region of an electronic device, a first input operation performed by an operating body on a surface of a button of the electronic device. The sensing region may overlap the surface of the button.

Specifically, in the embodiment, the operating body may be a user's finger. The button may be a hardware button on the electronic device which is arranged on a region outside the display screen. On the surface of the button, a sensing apparatus is integrated, which can detect a first input operation performed by an operator on a sensing region of the sensing apparatus. For example, when the electronic device is a smartphone, the button is the home menu button (i.e., the Home button) of the smartphone. The sensing apparatus may be arranged right below the button and within the housing of the electronic device, and its sensing region is just a portion of the button which protrudes from the housing. As long as the operating body performs an operation on the button, the sensing apparatus can obtain a position of texture information corresponding to the operating body.

Figure 2:
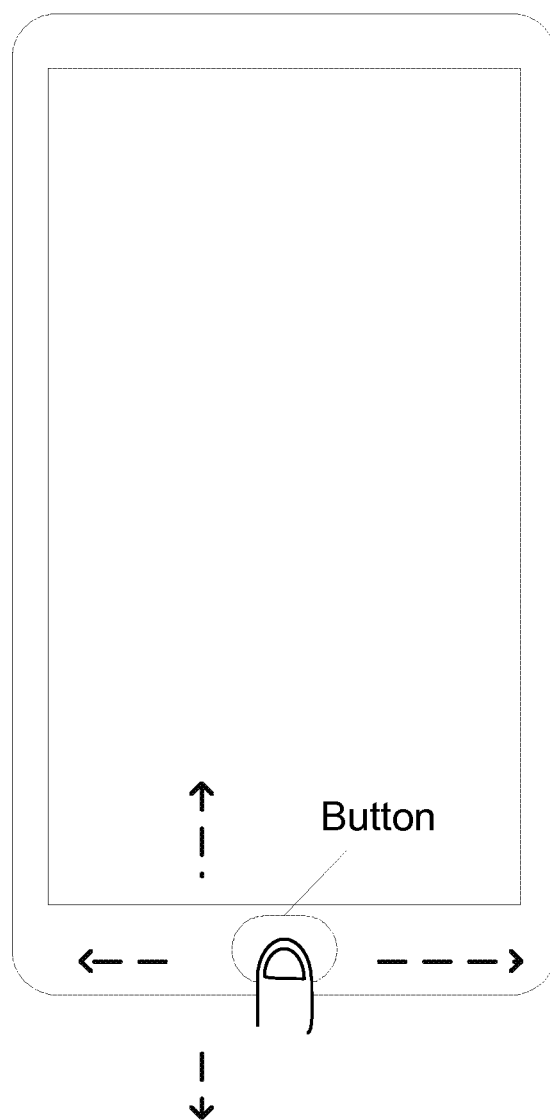
FIG. 2 is a schematic diagram illustrating a button arranged on an electronic device to which the information process method according to the first embodiment of the disclosure is applied.

As shown in FIG. 2 which is a schematic diagram of a button according to an embodiment of the disclosure, a sensing apparatus is integrated on a button of an electronic device. The sensing region of the sensing apparatus may correspond to a contacted surface of the button. When an operating body is in contact with the surface of the button or is within a range where it can be sensed, texture information generated by the operating body on the sensing region can be obtained by the sensing apparatus.

In the electronic device, there is provided a preset operation database, which stores different types of operations and algorithms for determining the corresponding operations, such as a sliding operation and an algorithm for determining the sliding operation, a tapping operation and an algorithm for determining the tapping operation, etc. After the first input operation performed by the operating body is detected by the button, it can be matched one by one with the operations in the preset operation database and the type of the first input operation can be determined.

Specifically, the first input operation may be determined as a sliding operation by:

acquiring, via the button, M pieces of texture information, which are generated by the operating body on the sensing region when the operating body is in contact with the surface of the button, M being an integer greater than or equal to 2;

determining, based on the M pieces of texture information, a changing trend of the M pieces of texture information, wherein the changing trend indicates a change of operation in a first process of an input operation performed by the operating body on the contact surface; and determining the first input operation based on the changing trend.

Specifically, in the embodiment, the texture information may be texture information of a finger. As the finger slides on the contact surface, the pressure it applies on the contact surface varies. The contact region between the finger and the contact surface and the area of the contact region also change continuously. Accordingly, feature points may be extracted for each of at least two pieces of texture information acquired, and the feature points for each of the pieces of texture information are all different. Then, based on the features points for the pieces of texture information, the changing trend is determined as moving in a first direction or in a second direction. The changing trend indicates a movement of the operating body on the contact surface.

For example, the feature points are point A and point B in a first texture on the operating body, and point A is different from point B. At a first time, points A and B are respectively located at positions X and Y. At a second time after the first time, points A and B are respectively located at positions Q and P. Thus, in the example, point A moves from position X to position Q, and point B moves from position Y to position P. If position Q is on the left of position X and position P is also on the left of position Y, then it can be determined that the operating body moves left relative to the contact surface and that the changing trend is moving to the left. Correspondingly, if position Q is on the right of position X and position P is also on the right of position Y, then it can be determined that the operating body moves right relative to the contact surface and that the changing trend is moving to the right.

The surface of the button on the electronic device may be arranged as a fingerprint touch sensing region of an array type. When a finger contacts the surface of the button, the button may also determine whether the operation performed by the finger on the button is a sliding operation, based on the varying position of the fingerprint on the array-type touch sensing region at different times. For example, at a first time, coordinates of the fingerprint in the touch sensing region are (40, 30). At a second time after the first time, coordinates of the fingerprint in the touch sensing region are (20, 30). Then, the electronic device may determine that a user's first input operation is a sliding operation from right to left. In detailed implementation, the algorithm for determining the sliding operation may be designed according to practice demands and is not limited herein.

Specifically, a tapping operation performed by the operating body may be detected via the button by:

acquiring, via the button, at least one piece of texture information generated by the operating body on the sensing region when the operating body is in contact with the surface of the button;

extracting feature points for each of the at least one piece of texture information;

determining whether the operating body taps the surface of the button, based on the feature points, to obtain a second judgment result;

determining the first input operation as a tapping operation, when the second judgment result is affirmative.

Specifically, in the embodiment, the operating body may be a finger, and the texture information may be texture information of the finger which includes various kinds of characteristic information—for example, feature points such as endpoints and bifurcating points of the fingerprint. When characteristic information is extracted from the fingerprint information acquired via the button, it can be determined whether the first input operation input by the user on the button is a tapping operation based on a changing trend of the characteristic information. For example, when fingerprint endpoints are obtained for each of at least one pieces of fingerprint information of the user's finger detected by the button and it is determined that relative positions of the fingerprint endpoints corresponding to the at least one pieces of fingerprint information do not change, the first input operation is determined as a tapping operation.

The button arranged on the electronic device may also be a touch button, which can determine a tapping operation performed by the user based on a change in capacitance or resistance of the sensing region when the user's finger performs a first operation on the sensing region of the button. In detailed implementation, the algorithm for determining the tapping operation may be designed according to practice demands and is not limited herein.

In an embodiment, the preset operation database may prestore various types of operations detectable by the button, including but not limited to the sliding operation and the tapping operation as described in detail in the embodiment. Other operations such as rolling and pressing performed by the operating body may also be detected by the button, and are not enumerated in the embodiment.

At S102, the first input operation is compared with at least two predetermined operations in a preset database; when the first input operation matches a first predetermined operation, a first control instruction corresponding to the first input operation is determined; and a corresponding operation may be performed in response to the first control instruction.

Specifically, in the embodiment, when the first input operation is detected by the button, the first input operation is compared with at least two predetermined operations in the preset database. When the first input operation successfully matches the first predetermined operation, the first control instruction corresponding to the first predetermined operation can be obtained. For example, the electronic device prestores a control instruction for displaying a home screen interface which corresponds to a single-click on the button, a control instruction for entering a multi-task interface which corresponds to a double-click on the button, etc. In detailed implementation, correspondence relationships between operations on the button and control instructions may be designed according to practical demands and are not limited herein. In the embodiment, detailed description will be given with respect to two exemplary cases where the first input operation is a sliding operation in a certain direction and a tapping operation respectively.

In the first case where the first input operation is a sliding operation in a certain direction which successfully matches a sliding operation in a first direction in the preset database, a switch instruction corresponding to the sliding operation in the first direction is determined as the first control instruction corresponding to the sliding operation in the certain direction. The switch instruction instructs a display screen of the electronic device to switch from a currently displayed first interface corresponding to a running state of a first application to a second interface corresponding to a running state of a second application. The display screen is thus controlled to switch from the first interface currently displayed to the second interface. The second application may be an application which has been started by the electronic device before the first application is in a running state.

Specifically, in the embodiment, the electronic device determines the operation generated by the user on the button as a sliding operation in a certain direction which matches a sliding operation in the first direction prestored in the preset database in the electronic device. As the preset instruction corresponding to the sliding operation in the first direction is a switch instruction, the electronic device obtains the switch instruction to switch between applications. For example, when the electronic device is currently running a first application, the user performs an operation of sliding left on the surface of the button and the electronic device obtains a switch instruction corresponding to the operation of sliding left. Because the display screen of the electronic device is currently in a state of displaying a first interface corresponding to the first application, the electronic device determines that it can respond to the switch instruction to switch between applications. Accordingly, the electronic device switches to running a second application and the display screen displays an interface corresponding to the second application.

As another example, when the electronic device is in a state of displaying the home screen interface, the user performs an operation of sliding left on the surface of the button and the electronic device obtains switch instruction corresponding to the operation of sliding left. Because the electronic device is currently in a state of displaying a home screen interface, the electronic device determines that it cannot respond to the switch instruction. That is, in order to switch between applications by performing a sliding operation on the button, a preset condition needs to be satisfied. For example, the electronic device can respond to the switch instruction only when it is in a state of running an application in itself.

Further, in order for the electronic device to switch between applications when detecting a sliding operation on the button, the electronic device needs to determine the specific second application to be switched to when it switches between applications. The determined second application may be an application in the electronic device which corresponds to the sliding operation. For example, the sliding operation is used to start a certain application in the electronic device, e.g., an application corresponding to a searching function or an application such as an application store. That is, the sliding operation is set solely for triggering the start of a certain application.

The determined second application may also be an application which has been started by the electronic device before and is now running in the background. The electronic device obtains a plurality of applications which have been started before and sorts the applications running in the background chronologically according to times when the applications switch to the background running state. Accordingly, the application which enters the background running state at a time closest to the current time is determined as the second application to be switched to. For example, supposing that application A enters the background running state at 9:00, Jun. 24, 2015, application B enters the background running state at 10:00, Jun. 24, 2015 and application C enters the background running state at 13:00, Jun. 24, 2015, the electronic device then sorts the applications in an ascending order of distances from the times when the applications switch to the background running state to the current time, resulting in a sequence of application C, application B and application A. When the sliding operation in the certain direction is a sliding operation from right to left, the electronic device knows that the application following the first application which is currently run is application C according to the sequence. Accordingly, the specific second application to be switched to is determined as application C, and the display screen may be switched from displaying a first interface corresponding to the first application to displaying a second interface corresponding to application C. When the sliding operation in the certain direction is a sliding operation from left to right, the electronic device knows that the application farthest from the first application that is currently run is application A according to the sequence. Accordingly, the specific second application to be switched to is determined as application A, and the display screen may be switched from displaying the first interface corresponding to the first application to displaying a second interface corresponding to application A.

The electronic device may switch between the applications according to a sorted sequence of background applications. For example, the electronic device is in a state of running application D and the display screen displays an interface corresponding to application D. The electronic device sorts the applications in an ascending order of distances from the times when the applications switch to the background running state to the current time, resulting in a sequence of application D, application C, application B and application A. During this switching process, the switching is always performed according to the sequence. When the electronic device detects an operation of sliding left on the button performed by the user, it switches from running application D to running application C. Accordingly, the display screen switches from displaying an interface corresponding to application D to displaying an interface corresponding to application C. After switching to running application C, the electronic device detects again an operation of sliding left on the button performed by the user. The switching sequence invoked by the electronic device is still application C, application B and application A. Namely, application B follows application C. Thus, the electronic device switches from running application C to running application B. Accordingly, the display screen switches from displaying the interface corresponding application C to displaying an interface corresponding to application B. When running application C, the electronic device may further detect an operation of sliding right on the button performed by the user. Because application D precedes application C, the electronic device switches from running application C to running application D. Accordingly, the display screen switches from displaying the interface corresponding to application C to displaying the interface corresponding to application D.

The switching sequence is released, when the electronic device quits the switching function. For example, when the electronic device switches to displaying the home screen or when the electronic device enters the screen-locked state, the electronic device releases or deletes the sequence of background applications corresponding to this switching process, and by default quits the switching function. When the user triggers the switching function again at a first time later, a switching sequence of background applications which corresponds to the first time is obtained and the switching is performed according to the sequence.

When the electronic device further detects a second input operation generated by the user on the button, it may respond to the second input operation in the following two manners.

In the first manner, the electronic device obtains a return instruction when the second input operation detected via the sensing region is different from the first input operation, and controls the display screen to switch from the second interface currently displayed to the first interface in response to the return instruction.

Specifically, in the embodiment of the disclosure, when the electronic device detects via the sensing region a second input operation which is different from the first input operation, it can determine a control instruction corresponding to the second input operation as a return instruction. Then, the electronic device can switch from the application which is currently run to the first application that was initially run, in response to the return instruction. Accordingly, the display screen displays the interface corresponding to the first application. For example, the electronic device is in a state of running application D and the display screen displays an interface corresponding to application D. The electronic device sorts the applications in an ascending order of distances from the times when the applications switch to the background running state to the current time, resulting in a sequence of application D, application C, application B and application A. During this switching process, the switching is always performed according to the sequence. When the electronic device detects an operation of sliding left on the button performed by the user, it switches from running application D to running application C. Accordingly, the display screen switches from displaying an interface corresponding to application D to displaying an interface corresponding to application C. After switching to running application C, the electronic device further detects the second input operation performed by the user on the button as an operation of sliding to the right. Because the operation of sliding to the right currently detected is different from the operation of sliding to the left, the electronic device obtains a return instruction corresponding to the second input operation and returns to application D which was initially run. Accordingly, the display screen switches from displaying the interface corresponding to application C to displaying the interface corresponding to application D.

In the second manner, the electronic device obtains a switch instruction when the second input operation detected via the sensing region is the same as the first input operation, and controls the display screen to switch from the second interface currently displayed to a third interface that is displayed when a third application runs in response to the switch instruction.

Specifically, in the embodiment of the disclosure, when the electronic device detects via the sensing region a second input operation which is the same as the first input operation, it can determine a control instruction corresponding to the second input operation still as the switch instruction and switches between applications according to a switching sequence obtained. For example, the electronic device is in a state of running application D and the display screen displays an interface corresponding to application D. The electronic device sorts the applications in an ascending order of distances from the times when the applications switch to the background running state to the current time, resulting in a sequence of application D, application C, application B and application A. When the electronic device detects an operation of sliding left on the button performed by the user, it switches from running application D to running application C. Accordingly, the display screen switches from displaying an interface corresponding to application D to displaying an interface corresponding to application C. After switching to running application C, the electronic device further detects the second input operation performed by the user on the button as an operation of sliding to the left. That is, the first input operation is the same as the second input operation. The electronic device determines to switch between applications once again. Thus, the operation of sliding to the left is generated twice. Because the application ranked 3rd after application D is application B, the electronic device switches from running application C to running application B. Accordingly, the display screen switches from displaying the interface corresponding to application C to displaying the interface corresponding to application B.

In the second case where the first input operation is a tapping operation which successfully matches a first predetermined operation in the preset database, a go-back instruction corresponding to the first predetermined operation is obtained and determined as the first control instruction corresponding to the tapping operation. The go-back instruction instructs the display screen of the electronic device to switch from a currently displayed fourth interface corresponding to the running state of the first application runs to a fifth interface corresponding to the running state of the first application. The fifth interface is an upper level interface of the fourth interface.

Specifically, in the embodiment, the electronic device determines the operation generated by the user on the button as a tapping operation which matches a tapping operation prestored in the preset database in the electronic device. As the preset instruction corresponding to the tapping operation is a go-back instruction, the electronic device obtains the go-back instruction to go back from the fourth interface currently displayed to the fifth interface which is an upper-level interface of the fourth interface. For example, when the electronic device is currently running the QQ Chat application and displaying an interface for chatting with a first contact and the user performs a tapping operation, the electronic device determines a first control instruction corresponding to the tapping operation as the go-back instruction. Accordingly, the electronic device controls the QQ Chat application to go back to an interface which is an upper level interface of the chat interface, such as contacts interface or initial functional interface displayed after the start of the QQ Chat application.

In detailed implementation, it is also possible to design for the electronic device various control instructions corresponding to a sliding operation, such as a volume-adjusting instruction. The electronic device determines whether an operation generated by the user on the button is the sliding operation, and prestores a preset instruction corresponding to the sliding operation as the volume-adjusting instruction. Further, after obtaining the volume-adjusting instruction corresponding to the sliding operation, the electronic device determines whether to respond to the instruction. If a condition for responding to the volume-adjusting instruction is satisfied by the electronic device, the electronic device adjusts the volume corresponding to the application that is currently run. For example, when the electronic device is running a first application and the user generates an upward sliding operation on the surface of the button, the electronic device obtains a volume-increasing instruction corresponding to the upward sliding operation. Because the electronic device is currently in a state of running the first application and it is determined that the first application which is for example a music playing application, a video displaying application, etc. has a function of outputting a prompt tone, the electronic device determines that the volume-increasing instruction can be responded to and accordingly adjusts the volume of the output prompt tone corresponding to the first application from a first volume to a second volume.

The electronic device may also prestore an instruction for adjusting display brightness which corresponds to the sliding operation. For example, the electronic device determines whether an operation generated by the user on the button is the sliding operation, and prestores a preset instruction corresponding to the sliding operation as the brightness-adjusting instruction. Further, after obtaining the brightness-adjusting instruction corresponding to the sliding operation, the electronic device determines whether to respond to the instruction. If a condition for responding to the brightness-adjusting instruction is satisfied by the electronic device, the electronic device adjusts the display brightness corresponding to the application that is currently run. For example, when the electronic device is running a first application and the user generates an upward sliding operation on the surface of the button, the electronic device obtains a brightness-increasing instruction corresponding to the upward sliding operation. Because the electronic device is currently in a state of running the first application and it is determined that the first application which is for example a browsing application, a video displaying application, etc. supports a brightness-adjusting function, the electronic device determines that the brightness-increasing instruction can be responded to and accordingly increases the display brightness corresponding to the first application from a first brightness to a second brightness. As another example, when the electronic device is in a state of displaying the home screen interface and the user generates a downward sliding operation on the surface of the button, the electronic device obtains a brightness-decreasing instruction corresponding to the downward sliding operation. Because the electronic device is currently in a state of displaying the home screen interface, the electronic device determines that the brightness-decreasing instruction is used to decrease the display brightness of the display screen of the electronic device from a first brightness to a second brightness.

As a further example, when the electronic device runs a first application and the user generates an upward sliding operation on the surface of the button, the electronic device obtains a brightness-increasing instruction corresponding to the upward sliding operation. Because the electronic device is currently in a state of running the first application and it is determined that the first application which is for example a calendar application, a calculator application, etc. does not support the brightness-adjusting function, the electronic device determines that the brightness-increasing instruction cannot be responded to. That is, in order to adjust the display brightness for the application in response to the upward sliding operation on the button, a preset condition needs to be satisfied, which is for example the application currently run by the electronic device supports the brightness-adjusting function.

Further, when the electronic device prestores at least two control instructions corresponding to the sliding operation, the electronic device may also determine a first control instruction corresponding to the current sliding operation by obtaining an ambient parameter of an environment where the electronic device exists and a running state parameter of the electronic device. For example, the electronic device determines whether an operation generated by the user on the surface of the button is the sliding operation, and prestores at least two preset instructions corresponding to the sliding operation, such as brightness adjusting, volume adjusting, etc. Therefore, in order to avoid a conflict between functions corresponding to the sliding operation, the electronic device needs to obtain the ambient parameter and the running state parameter of the electronic device, so as to determine a specific one of the plurality of applications that is triggered by the sliding operation.

For example, the preset instructions corresponding to the sliding operation include a volume-adjusting instruction and a brightness-adjusting instruction. After detecting the sliding operation on the button, the electronic device detects a current display brightness of its display unit and an ambient brightness parameter of the environment where the display unit exists. If the ambient brightness parameter is greater than a first ambient brightness threshold and the current brightness of the display unit is lower than a first brightness threshold, then the electronic device can determine the preset instruction corresponding to the sliding operation as the brightness-adjusting instruction, and accordingly adjust the display brightness in response to the brightness-adjusting instruction. In other words, in the embodiment, the display brightness of the display unit can be adjusted based on the ambient brightness parameter. This is advantageous because it is difficult for a user to properly enter an interface for adjusting the display brightness using the display unit and to adjust the display brightness in case the ambient light intensity is high while the display brightness of the display unit is low. In this manner, the user can adjust the display brightness of the electronic device simply by performing sliding operation on the button. In detailed implementation, the first ambient brightness threshold and the first brightness threshold can be set according to practical demands and are not limited herein.

As another example, the preset instructions corresponding to the sliding operation include a volume-adjusting instruction and a brightness-adjusting instruction. After detecting the sliding operation on the button, the electronic device detects an ambient noise parameter of the environment where the display unit exists and an output volume corresponding to the application currently run by the electronic device. If the ambient noise parameter is greater than a first threshold and the output volume is lower than a second threshold, then the electronic device can determine the preset instruction corresponding to the sliding operation as the volume-adjusting instruction, and accordingly adjust the output volume of the electronic device in response to the volume-adjusting instruction. In detailed implementation, the first threshold and the second threshold can be set according to practical demands and are not limited herein.

Second Embodiment

Figure 3:
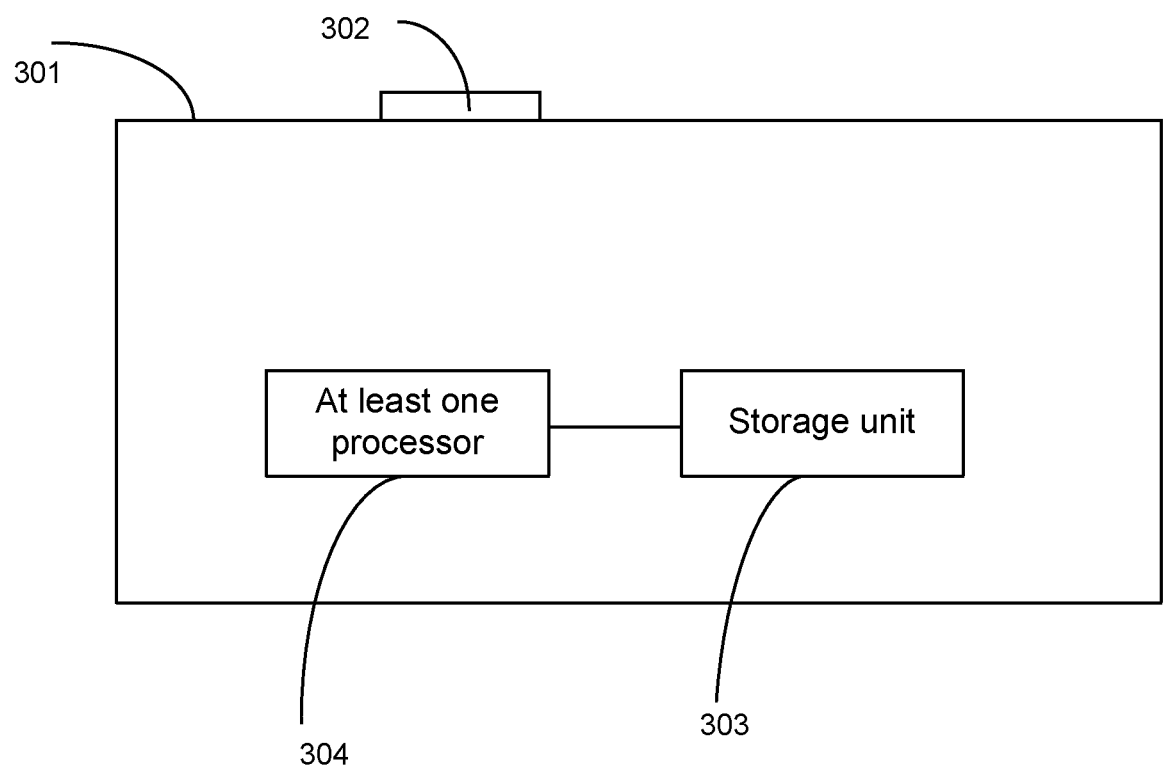
FIG. 3 is a structural diagram of an electronic device according to a second embodiment of the disclosure.

Referring to FIG. 3, the embodiment of the disclosure provides an electronic device, comprising:
a housing 301;
a button 302 arranged at a first position on the housing and having a sensing region arranged on its surface, the sensing region being configured to detect a first operation performed with respect to the button;
a storage unit 303 arranged within the housing and configured to store at least one program module;
at least one processor 304 arranged within the housing and being configured to obtain and run the at least one program module to
  compare the first input operation with at least two predetermined operations in a preset database;
  when the first input operation matches a first predetermined operation, determine a first control instruction corresponding to the first input operation; and
  performing a corresponding operation in response to the first control instruction.

Optionally, the button is specifically configured to acquire at least two fingerprint images generated by a finger on the sensing region and transmit the at least two fingerprint images to the at least one processor; and
the at least one processor determines whether the finger slides on the sensing region, based on the at least two fingerprint images, to obtain a first judgment result; and determines the first operation as a sliding operation when the first judgment result is affirmative.

Optionally, the at least one processor is further configured to:
determine the first operation belongs to the at least two preset operations, when a preset instruction corresponding to the sliding operation is prestored in the electronic device;
obtain a switch instruction prestored in the electronic device which corresponds to the sliding operation;
switch the electronic device from running a first application to running a second application in response to the switch instruction.

Optionally, the at least one processor is further configured to:
obtain at least one applications which the electronic device runs in the background;
sort the at least one applications chronologically according to times when the applications switch to a background running state;
switch the first application from a running state to a background running state and switch the second application from a background running state to a running state.

Optionally, the at least one processor is further configured to:
determine that the first operation belongs to the at least two preset operations, when a preset instruction corresponding to the sliding operation is prestored in the electronic device;
obtain a volume adjusting instruction prestored in the electronic device which corresponds to the sliding operation, wherein the volume adjusting instruction is used to adjust an output volume corresponding to a first application which the electronic device runs; and in response to the volume adjusting instruction, adjust the output volume corresponding to the first application from a first volume to a second volume.

Optionally, the at least one processor is further configured to:

determine that the first operation belongs to the at least two preset operations, when a preset instruction corresponding to the sliding operation is prestored in the electronic device;

obtain a display brightness adjusting instruction prestored in the electronic device which corresponds to the sliding operation, wherein the display brightness adjusting instruction is used to adjust a display brightness corresponding to a first application which the electronic device runs; and in response to the display brightness adjusting instruction, adjust the display brightness corresponding to the first application from a first brightness to a second brightness.

Optionally, the at least one processor is further configured to:

determine that the first operation belongs to the at least two preset operations, when a preset instruction corresponding to the sliding operation is prestored in the electronic device;

obtain an ambient parameter of an environment where the electronic device exists and a running state parameter of the electronic device;

based on the ambient parameter and the running state parameter, determine an instruction which corresponds to the sliding operation at present as a first preset instruction among the at least two instructions; and control the electronic device to execute the first preset instruction.

Third Embodiment

Figure 4:
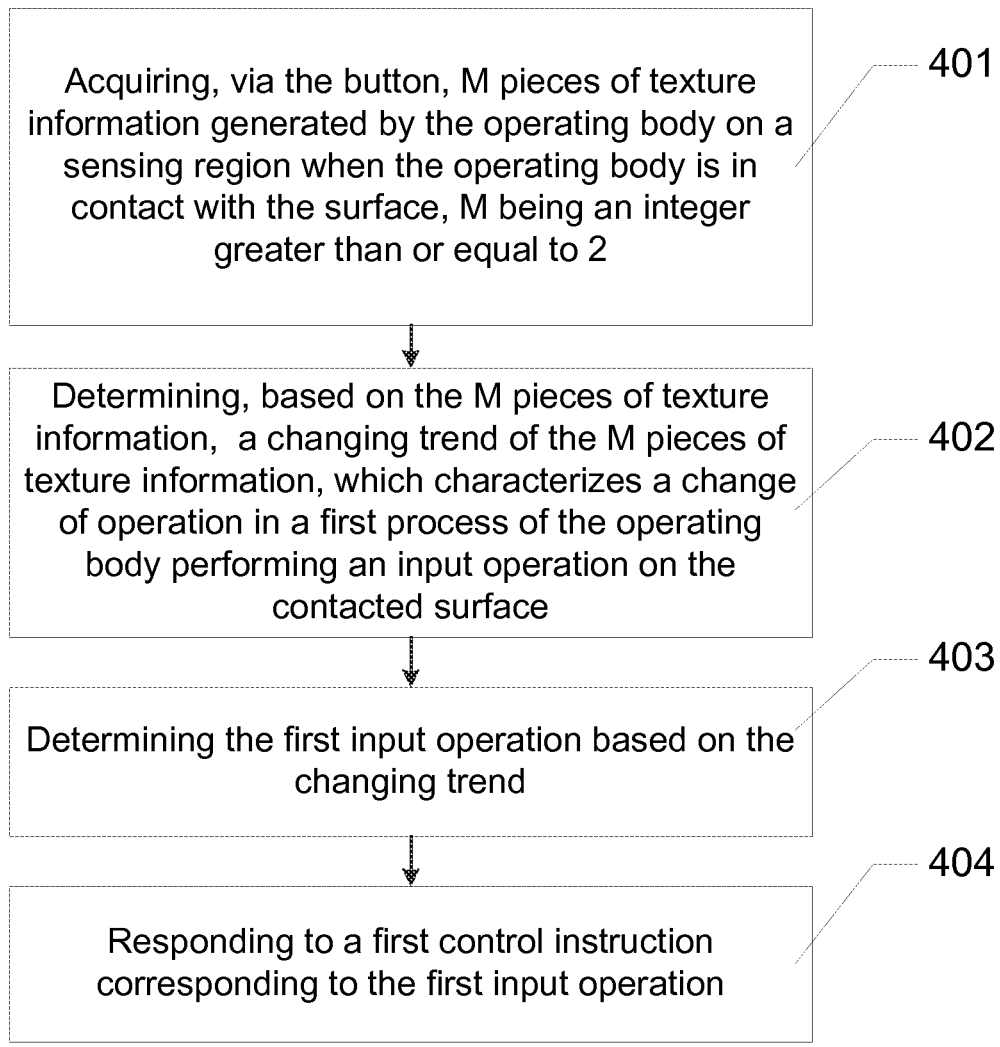
FIG. 4 is a flowchart of an information processing method according to a third embodiment of the disclosure.

Preferably, as illustrated in FIG. 4, an information processing method according to the third embodiment of the disclosure comprises: at step 401, obtaining M pieces of texture information of an operating body in a sensing region corresponding to a contact surface of a first button of an electronic device, if the operating body performs an input operation on the contact surface, M being an integer greater than or equal to 2.

The M pieces of texture information of the operating body imply that the surface of the operating body is not a smooth surface but a surface with recesses and bulges. The recesses and/or bulges on the surface constitute a texture on the operating body.

Because the texture is constituted by the recesses and/or bulges on the operating body, it has a depth in the direction perpendicular to the surface of the operating body, i.e., the depth of the recesses or the height of the bulges. Meanwhile, the texture has a width on the plane tangent to the surface of the operating body, i.e., the width of the recesses or the width of the bulges. The texture information may characterize the recesses and/or bulges and even information on a certain part of the operating body which corresponds to the texture.

For example, the texture information may be one or more position parameters of one or more specific points on the texture. The texture information may also be a recess depth parameter and/or a bulge height parameter of the texture. The recess depth parameter may characterize the depth of the recesses on the texture, and the bulge height parameter may characterize the height of the bulges on the texture.

For the execution of this step, a sensing apparatus may be arranged on the button of the electronic device and a sensing region of the sensing apparatus may correspond to the contact surface of the button. When the operating body is in contact with the contact surface of the button or is within a range where it can be sensed, the texture information can be obtained by the sensing apparatus.

The sensing region of the sensing apparatus may be arranged at a position corresponding to the contact surface of the button. For example, the sensing apparatus may be arranged right below the button and within the housing of the electronic device, and its sensing region is just a portion of the button which protrudes from the housing. As long as the operating body performs an operation on the button, the sensing apparatus can obtain a position of texture information as a corresponding position on the button.

Depending on different meanings of the texture information, the sensing apparatus may be set differently according to practical demands. In prior art, the texture information can be obtained in various manners, which are not enumerated here.

It is to be noted that, during the execution of this step, the M pieces of texture information are not multiple pieces of texture information obtained at a certain time point but are one or more pieces of texture information obtained at each of multiple time points.

For example, the texture information is a recess depth parameter of a first texture on the operating body. At a first time in a process of the operating body contacting the contact surface of the button, the recess depth parameter of the first texture is 1 mm. At a second time in the process of the operating body contacting the contact surface of the button, the recess depth parameter of the first texture is 0.5 mm. Here, 1 mm and 0.5 mm may be the M pieces of texture information, M being equal to 2.

As another example, the texture information is recess width parameters of a second texture and a third texture of the operating body. At a first time in a process of the operating body contacting the contact surface of the button, the recess width parameter of the second texture is 1 mm and the recess width parameter of the third texture is 2 mm. At a second time in the process of the operating body contacting the contact surface of the button, the recess width parameter of the second texture is 0.5 mm and the recess width parameter of the third texture is 0.8 mm. Here, 1 mm and 0.5 mm for the second texture and 2 mm and 0.8 mm for the third texture may be the M pieces of texture information, M being equal to 4.

In practical operation, during a fixed time period, the more time points the pieces of texture information are obtained at, the more accurate the analysis result is. Therefore, in practical operation, the time points for obtaining the texture information in the process of the operating body performing the input operation can be set arbitrarily according to practical demands. For the sake of conciseness, detailed description is omitted here.

At step 402, a changing trend of the M pieces of texture information is determined based on the M pieces of texture information. The changing trend indicates a change of operation in a first process of an input operation performed by the operating body.

Because the M pieces of texture information are one or more pieces of texture information obtained for each of multiple time points in the process of the operating body contacting the contact surface of the button, the M pieces of texture information may indicate a changing trend of the texture on the operating body in the time period including the multiple time points, i.e., in the process that operating body contacting the contact surface of the button.

By analyzing the changing trend of the texture in the process that the operating body contacting the contact surface of the button, a moving trend of the operating body during the process can be obtained, i.e., it can be determined what operation is performed by the operating body during the process.

It is to be noted that, because the operating body may perform a pressing operation or a releasing operation in a direction with respect to the contact surface of the button, the operating body may be in a state of tending to move in a direction towards the contact surface while keeping its position relative to the contact surface unchanged.

Therefore, in practical execution of this step, the changing trend may indicate a direction in which the operating body tends to move. In the execution of the step, the position of the operating body may or may not change.

At step 403, the input operation is determined as a first input operation based on the changing trend.

By analyzing the changing trend of the texture in the process of the operating body contacting the contact surface of the button, the moving trend of the operating body during the process can be obtained, i.e., it can be determined what operation is performed by the operating body during the process. The moving trend may indicate the direction in which the operating body tends to move. Thus, by analyzing the changing trend of the M pieces of texture information obtained at step 402, it can be determined which operation is performed by the operating body during the process. Correspondingly, different control instructions can be determined.

At step 404, a corresponding operation is performed in response to a first control instruction corresponding to the first input operation.

During the execution of this step, the control instruction determined by performing step 403 is executed.

For example, when the changing trend of the texture information indicates that the direction in which the operating body tends to move is towards the contact surface, a control instruction for turning on a first brightness backlight is determined and executed.

As another example, when the changing trend of the texture information indicates that the direction in which the operating body tends to move is away from the contact surface, a control instruction for turning on a first background music is determined and executed.

In practical operation, the control instruction executed at this step may be set arbitrarily according to practical demands. For the sake of conciseness, detailed description is omitted here.

Thus, according to the technical solution of the embodiment of the disclosure, it is possible to obtain M pieces of texture information of the operating body in the sensing region corresponding to the contact surface when the operating body performs an input operation on the contact surface of the first button of the electronic device, then determine a changing trend of the M pieces of texture information based on the M pieces of texture information, next determine the input operation of the operating body based on the changing trend, and finally respond to a first control instruction corresponding to the input operation of the operating body. In this manner, the technical solution according to the embodiment of the disclosure enables provision of more operations for which corresponding application functions can be directly performed without having to click and select them from a menu. Accordingly, smartness and applicability of the electronic device are improved.

Further, the embodiment of the disclosure also provides a specific method of obtaining the M pieces of texture information as follows.

Step 402 at which the changing trend of the M pieces of texture information is determined based on the M pieces of texture information may comprise:

extracting feature points for each of the M pieces of texture information, wherein the feature points for said each of the M pieces of texture information are different from each other;

determining an area value for said each of the M pieces of texture information corresponding to the feature points;

determining the changing trend, based on a change of the area value for said each of the M pieces of texture information in the first process.

A feature point refers to a fixed point corresponding to a certain textural position, instead of a point in space fixed relative to the button. For example, when the operating body is a finger, the feature point may be a point at which cell A on the fingerprint is located.

Based on the feature points for each piece of texture information, a shape corresponding to these feature points can be determined. Depending on the shape, the area value may represent a length of a line segment or an area of a polygon.

For example, the texture information is point A and point B in a first texture on the operating body, and point A is different from point B. At a first time, points A and B are respectively located at positions X and Y. At a second time after the first time, points A and B are respectively located at positions Q and P. Thus, in this example, the area values for the pieces of texture information may respectively represent a length of a first line segment between positions X and Y and a length of a second line segment between positions Q and P. Accordingly, in this example, the change of the area value for each piece of texture information in the first process may refer to a change between the lengths of the first line segment and the second line segment. When the length of the first line segment is greater than the length of the second line segment, it may indicate that the first texture is contracted during the process. Therefore, it can be derived that, in the process of the operating body performing an input operation at a fixed position (i.e., the first position) on the contact surface, the operation force applied with respect to the contact surface increases. When the length of the first line segment is less than the length of the second line segment, it may indicate that the first texture is expanded during the process. Therefore, it can be derived that, in the process of the operating body performing an input operation at a fixed position (i.e., the first position) on the contact surface, the operation force applied with respect to the contact surface decreases. Further, when the operation force applied with respect to the contact surface increases, the electronic device may be controlled to generate and respond to an operation instruction for increasing the volume of the electronic device. When the operation force applied with respect to the contact surface decreases, the electronic device may be controlled to generate and respond to an operation instruction for decreasing the volume of the electronic device.

As another example, the texture information is points A, B and C in a second texture on the operating body, and points A, B and C are different from each other. At a first time, points A, B and C are respectively located at positions X, Y and Z. At a second time after the first time, points A, B and C are respectively located at positions Q, P and S. Thus, in this example, the area values for the pieces of texture information may respectively represent a first area of a triangle determined by positions X, Y and Z and a second area of a triangle determined by positions Q, P and S. Accordingly, in this example, the change of the area value for each piece of texture information in the first process may refer to a change between the first area and the second area. When the first area is less than the second area, it may indicate that the first texture is expanded in the process. Therefore, it can be derived that, in the process of the operating body performing an input operation at a first position on the contact surface, the operation force applied with respect to the contact surface decreases. When the first area is greater than the second area, it may indicate that the first texture is contracted in the process. Therefore, it can be derived that, in the process of the operating body performing an input operation at the first position on the contact surface, the operation force applied with respect to the contact surface increases. Further, when the operation force applied with respect to the contact surface increases, the electronic device may be controlled to generate and respond to an operation instruction for increasing the backlight brightness of the electronic device. When the operation force applied with respect to the contact surface decreases, the electronic device may be controlled to generate and respond to an operation instruction for decreasing the backlight brightness of the electronic device.

It is to be noted that the area value for each piece of texture information may be an area value corresponding to one piece of texture information at a time or multiple area values corresponding to one piece of texture information at that time. For example, one piece of texture may correspond to an area value of the first half of the texture and an area value of the second half of the texture. Because any slight change of operation may cause a significant change in area of the texture in the process of the operating body performing an input operation, it is highly accurate to determine the moving trend of the operating body based on the change of the area value of the texture.

It should also be noted that, during the execution of this step, the position of the operating body relative to the contact surface of the button may be fixed. That is to say, in the execution of the step, the button is a state of not being pressed down.

Since a predetermined function is typically specified for the button of the electronic device, the electronic device will perform the predetermined function when the button is pressed down. Therefore, in order to prevent the implementation of the technical solution according to the embodiment of the disclosure from conflicting with the performance of the predetermined function by the electronic device, it is preferable to implement the technical solution without pressing down the button.

If the button does not correspond to a predetermined function all the time or in a certain application scenario, then it is also possible to implement the technical solution according to the embodiment of the disclosure when the button is pressed down.

On the other hand, in practical operation, the more area values for the pieces of texture information are analyzed for determining a change in area, the more accurate the analysis result is.

Thus, according to the technical solution of the embodiment of the disclosure, it is possible to extract feature points for each of M pieces of texture information so as to determine an area value for said each of the M pieces of texture information corresponding to the feature points for said each of the M pieces of texture information, and then determine the changing trend based on a change of the area value for each piece of texture information in the first process. The changing trend indicates a change of the operation force applied with respect to the contact surface in a process of the operating body performing an input operation at a first position on the contact surface. In this manner, the technical solution according to the embodiment of the disclosure on one hand has the advantage of improving accuracy in determining the changing trend and on the other hand has the advantage of avoiding misoperation.

Further, the embodiment of the disclosure provides another method for obtaining the M pieces of texture information as follows.

Step 402 at which the changing trend of the M pieces of texture information is determined based on the M pieces of texture information may comprise:

extracting feature points for each of the M pieces of texture information, wherein the feature points for said each of the M pieces of texture information are different from each other;

determining a moving direction of the operating body as a first direction, based on changes in position of the feature points for said each of the M pieces of texture information in the first process;

taking the moving direction determined as the first direction as the changing trend.

Likewise, a feature point refers to a fixed point corresponding to a certain textural position, instead of a point in space fixed relative to the button.

By analyzing displacements of feature points on the texture in the process of the operating body contacting the contact surface of the button, a direction of displacement of the operating body during this process can be obtained.

In this process, the position of the operating body relative to the contact surface of the button may or may not change.

For example, the texture information is points A and B in a first texture on the operating body, and point A is different from point B. At a first time, points A and B are respectively located at positions X and Y. At a second time after the first time, points A and B are respectively located at positions Q and P. Thus, in the example, point A moves from position X to position Q, and point B moves from position Y to position P. If position Q is on the left of position X and position P is also on the left of position Y, then it can be determined that the operating body moves left relative to the contact surface and that the changing trend is moving to the left. Correspondingly, if position Q is on the right of position X and position P is also on the right of position Y, then it can be determined that the operating body moves right relative to the contact surface and that the changing trend is moving to the right. Further, when the direction in which the operating body moves relative to the contact surface is towards the left, the electronic device may be controlled to generate and respond to an operation instruction for switching the page displayed by the electronic device to the previous page. When the direction in which the operating body moves relative to the contact surface is towards the right, the electronic device may be controlled to generate and respond to an operation instruction for switching the page displayed by the electronic device to the next page.

As another example, the texture information is points A and B in a first texture on the operating body, and point A is different from point B. At a first time, points A and B are respectively located at positions X and Y. At a second time after the first time, point A is still located at position X (it can also be located within a predetermined range from position X) and point B is located at position P. Thus, in this example, the position of point A does not change, and point B moves from position Y to position P. If position Y is above position P, then it can be determined that the operating body rotates in a clockwise direction relative to the contact surface and that the changing trend is a clockwise rotation. Correspondingly, if position Y is below position P, then it can be determined that the operating body rotates in a counterclockwise direction relative to the contact surface and that the changing trend is a counterclockwise rotation. Further, when the direction in which the operating body rotates relative to the contact surface is the clockwise direction, the electronic device may be controlled to generate and respond to an operation instruction for rotating the display interface of the electronic device in the clockwise direction. When the direction in which the operating body rotates relative to the contact surface is the counterclockwise direction, the electronic device may be controlled to generate and respond to an operation instruction for rotating the display interface of the electronic device in the counterclockwise direction.

In the process of analyzing which direction the operating body moves in, a more accurate analysis result can be obtained by acquiring specific positions of the feature points at more time points. For the sake of conciseness, detailed description is omitted here.

Thus, according to the technical solution of the embodiment of the disclosure, it is also possible to determine the moving direction of the operating body based on changes in position of the feature points for each piece of texture information in the process of the operating body performing an input operation on the contact surface and take the determined moving direction as the changing trend. In this manner, the technical solution according to the embodiment of the disclosure also has the advantage of improving applicability of the electronic device.

Further, the embodiment of the disclosure provides an additional method for obtaining the M pieces of texture information as follows.

Step 402 at which the changing trend of the M pieces of texture information is determined based on the M pieces of texture information may comprise:

extracting feature points for each of the M pieces of texture information, wherein the feature points for said each of the M pieces of texture information are different from each other;

determining a rolling direction of the operating body as a second direction, based on changes of the feature points for said each of the M pieces of texture information in the first process; and taking the rolling direction determined as the second direction as the changing trend.

Likewise, a feature point refers to a fixed point corresponding to a certain textural position.

By analyzing changes in state of feature points on the texture in the process of the operating body contacting the contact surface of the button and other parametric changes determined based on these feature points, a rolling direction of the operating body during this process can be obtained.

For example, the texture information is points A and B in a first texture on the operating body, and point A is different from point B. At a first time, A is located at position X, and B disappears. At a second time after the first time, A disappears, and B is located at position Y. Thus, in the example, it can be determined that the operating body performs a rolling operation whereby it is possible for points A and B to disappear sequentially. If position X is on the left of position Y, then it can be determined that the operating body rolls right relative to the contact surface and that the changing trend is rolling to the right. Correspondingly, if position X is on the right of position Y, then it can be determined that the operating body rolls left relative to the contact surface and that the changing trend is rolling to the left.

As another example, the texture information is points A, B and C in a second texture on the operating body, and points A, B and C are different from each other. At a first time, points A, B and C are respectively located at positions X, Y and Z, which positions determine a triangle a. At a second time after the first time, points A, B and C are respectively located at positions Q, P and S, which positions determine a triangle b. It is supposed that triangle a formed at the first time has an angle of 50 degrees at position X which is one of its vertexes and an angle of 20 degrees at position Z which is another one of its vertexes and the triangle b formed at the second time has an angle of 30 degrees at position Q which is one of its vertexes and has an angle of 40 degrees at position S which is another one of its vertexes. Because forces applied to individual points vary as the operating body rolls, the force applied to a point is the maximum and hence the width of the texture corresponding to the point increases, when the point contacts the contact surface as the operating body rolls. Therefore, by analyzing changes of angles of each triangle determined by three features points, it can be derived that in this example the operating body rolls in a direction from point A to point C. Accordingly, the changing trend is rolling in a direction from A to point C.

Thus, according to the technical solution of the embodiment of the disclosure, it is also possible to obtain a rolling direction of the operating body in the process of the operating body contacting the contact surface of the button by analyzing changes in state of feature points on the texture in the process and other parametric changes determined based on these feature points and thereby determine the changing trend. In this manner, the technical solution according to the embodiment of the disclosure also has the advantage of further improving applicability of the electronic device.

Further, the embodiment of the disclosure also provides a control instruction that is correspondingly implemented based on the above analysis result.

Step 404 at which the first control instruction corresponding to the first input operation is responded to comprises:

responding to the first control instruction for adjusting a display parameter for a content displayed on a display screen of the electronic device.

The display parameter may include a parameter for a picture displayed on the display screen, such as display scale, contrast, saturation, power for displaying, etc.

The display parameter may also include a parameter related to the specific content displayed in the display screen. For example, when the content displayed in the display screen is an electronic book, the display parameter may be a page number of the electronic book. When the display parameter is adjusted, the display screen displays a different page of the electronic book.

As another example, when the content displayed in the display screen is a webpage larger than the display interface of the display screen, the display parameter may be part of the webpage displayed by the display screen. That is to say, when the display parameter is adjusted, contents at a different position in the webpage can be seen by the user.

Thus, any parameter related to the content displayed in the display screen, either a performance index parameter for a displayed picture or a parameter indicating the specific content displayed in the display screen, may be used as the display parameter.

When the system determines through analysis the input operation of the operating body as a first operation, it can respond to the first control instruction corresponding to the first operation. Specifically, the first control instruction may be the first control instruction for adjusting the display parameter for the content displayed on the display screen of the electronic device.

For example, the first operation of the operating body may be an operation of rolling to the left. When the electronic device detects that the operating body performs an operation of rolling to the left, it may be controlled to scale up a picture displayed in the display screen of the electronic device. When the electronic device detects that the operating body performs an operation of rolling to the right, it may be controlled to scale down the picture displayed in the display screen of the electronic device.

As another example, the first operation of the operating body may be moving to the right. When the electronic device detects that the operating body performs an operation of moving to the right, it may be controlled to render text on the display screen of the electronic device in red. When the electronic device detects that the operating body performs an operation of moving to the left, it may be controlled to render text on the display screen of the electronic device in green.

Thus, according to the technical solution of the embodiment of the disclosure, it is possible to directly execute the first control instruction for adjusting the display parameter for the content displayed on the display screen of the electronic device after determining that the operating body performs an operation corresponding to the instruction. In this manner, the technical solution according to the embodiment of the disclosure also has the advantage of improving efficiency in operating the electronic device.

In the implementation of the embodiment of the disclosure, a finger may be used as the operating body and the electronic device may be a handset provided with only one Home button. In addition, a sensing apparatus is arranged within the handset, the sensing region of the sensing apparatus is just the contact surface of the Home button of the handset (i.e., an exposed portion of the Home button which protrudes from the housing of the handset).

At a first time when the finger contacts the contact surface of the Home button (which can be regarded as the moment the finger begins to contact the contact surface), a first group of fingerprint information including fingerprints A and B on the finger can be obtained by the sensing apparatus.

0.5 s after the moment the finger begins to contact the contact surface, a second group of fingerprint information including fingerprints A and B on the finger may be obtained by the sensing apparatus.

1 s after the moment the finger begins to contact the contact surface, a third group of fingerprint information including fingerprints A and B on the finger may be obtained by the sensing apparatus.

Thus, the groups of fingerprint information are the M pieces of texture information. Each group of fingerprint information may be a fingerprint image including multiple fingerprints which is obtained at a different time, a fingerprint curve including multiple fingerprints, or a three-dimensional simulation image including multiple fingerprints, etc.

In the embodiment of the disclosure, the fingerprint information is a stereoscopic image including fingerprints A and B which is obtained by the sensing apparatus. Fingerprint ridges can be reflected using the stereoscopic image.

Thus, the first group of fingerprint information is the stereoscopic image including fingerprints A and B which is obtained at the first time, the second group of fingerprint information is the stereoscopic image including fingerprints A and B which is obtained 0.5 s after the first time, and the third group of fingerprint information is the stereoscopic image including fingerprints A and B which is obtained 1 s after the first time.

Further, feature points in fingerprints A and B may be obtained. In the embodiment of the disclosure, point a and point b (which is different from point a) on fingerprint A may be obtained from the first group of fingerprint information, and points a and b correspond respectively to different cells on fingerprint A. Meanwhile, point c and point d (which is different from point c) on fingerprint B may be obtained from the first group of fingerprint information, and points c and d correspond respectively to different cells on fingerprint B.

After the feature points in fingerprints A and B are determined, it can be determined, based on specific positions of points a, b, c and d in the first, second and third groups of fingerprint information, what operation is performed by the finger during the time period from the first time to 1 s after the first time.

In the embodiment of the disclosure, in the first group of texture information, points a, b, c and d are located at positions $X_1$, $Y_1$, $Z_1$ and $S_1$ respectively; in the second group of texture information, points a, b, c and d are located at positions $X_2$, $Y_2$, $Z_2$ and $S_2$ respectively; in the third group of texture information, points a, b, c and d are located at positions $X_3$, $Y_3$, $Z_3$ and $S_3$ respectively.

Then, a quadrangle can be defined by positions $X_1$, $Y_1$, $Z_1$ and $S_1$. Considering that there is a high possibility that points a, b, c and d are not in the same plane, in order to make the analysis result more accurate, it is possible to project the quadrangle defined by positions $X_1$, $Y_1$, $Z_1$ and $S_1$ on a reference plane so as to obtain a more accurate area value on the reference plane. In the embodiment of the disclosure, the reference plane may be the contact surface of the button.

That is to say, subsequently, the quadrangle defined by positions $X_1$, $Y_1$, $Z_1$ and $S_1$ is projected on the contact surface of the button. Thus, the area value of the projected quadrangle is obtained as 5 mm$^2$ for the first group of fingerprint information.

Similarly, the quadrangle defined by positions $X_2$, $Y_2$, $Z_2$ and $S_2$ is projected on the contact surface of the button, and thus the area value of the projected quadrangle is obtained as 6 mm$^2$ for the second group of fingerprint information. The quadrangle defined by positions $X_3$, $Y_3$, $Z_3$ and $S_3$ is projected on the contact surface of the button, and thus the area value of the projected quadrangle is obtained as 7 mm$^2$ for the third group of fingerprint information.

In this manner, the area value for each group of texture information corresponding to the feature points for each group of texture information is determined.

Thus, during the period from the first time to 1 s after the first time, the area value for each group of texture information increases continuously. In the embodiment of the disclosure, by analyzing the changing trend of the M pieces of texture information (i.e., the change of the area value for each group of texture information which corresponds to the feature points for the group of texture information), a change of an operation force applied by the finger with respect to the contact surface during the period from the first time to 1 s after the first time can be obtained.

This is because, when the operation force applied by the finger with respect to the contact surface increases, fingerprints change from a state of being stretched to a state of being contracted, resulting in an increase of the distance between the fingerprints and accordingly a gradual increase of the area value corresponding to the feature points. When fingerprints change from the state of being contracted to a state of being stretched, the distance between the fingerprints will decrease and accordingly the area value corresponding to the feature points will decrease gradually.

Thus, in the embodiment of the disclosure, the area value for each group of texture information corresponding to the feature points for the group of texture information increases gradually. Accordingly, an input operation analysis result of increasing the operation force applied by the finger with respect to the contact surface during the period from the first time to 1 s after the first time is obtained.

When the input operation analysis result of increasing the operation force applied by the finger with respect to the contact surface is obtained, the database of the electronic device can be searched for a control instruction corresponding to the input operation of increasing the operation force.

In the embodiment of the disclosure, the control instruction corresponding to the input operation of increasing the operation force is to enlarge the picture displayed in the display screen. Therefore, when the electronic device obtains through analysis the input operation of increasing the operation force applied by the finger with respect to the contact surface, it will enlarge the picture displayed in the display screen.

On the other hand, if the area value for each group of texture information corresponding to the feature points for the group of texture information decreases gradually during the period from the first time to 1 s after the first time, an input operation analysis result of decreasing the operation force applied by the finger with respect to the contact surface during the period from the first time to 1 s after the first time can be obtained through analysis.

When the input operation analysis result of decreasing the operation force applied by the finger with respect to the contact surface is obtained, the database of the electronic device can be searched for a control instruction corresponding to the input operation of decreasing the operation force.

In the embodiment of the disclosure, the control instruction corresponding to the input operation of decreasing the operation force is to shrink the picture displayed in the display screen. Therefore, when the electronic device obtains through analysis the decrease of the operation force applied by the finger with respect to the contact surface as the input operation, it will shrink the picture displayed in the display screen.

In the technical solution according to the embodiment of the disclosure, the electronic device may be controlled to directly execute a control instruction in the following three manners, in addition to by analyzing the operation force applied by the finger with respect to the contact surface.

In the first manner, three groups of texture information including fingerprints A and B are obtained during the period from the first time to 1 s after the first time as described above. Also, according to the texture information, feature points on fingerprints A and B are determined as points a, b, c and d. In the first group of texture information, points a, b, c and d are located at positions $X_1$, $Y_1$, $Z_1$ and $S_1$ respectively; in the second group of texture information, points a, b, c and d are located at positions $X_2$, $Y_2$, $Z_2$ and $S_2$ respectively; in the third group of texture information, points a, b, c and d are located at positions $X_3$, $Y_3$, $Z_3$ and $S_3$ respectively.

Supposing that positions $X_2$, $Y_2$, $Z_2$ and $S_2$ are below positions $X_1$, $Y_1$, $Z_1$ and $S_1$ respectively and positions $X_3$, $Y_3$, $Z_3$ and $S_3$ are below positions $X_2$, $Y_2$, $Z_2$ and $S_2$, then it can be determined, by analyzing the displacements of the feature points, that the finger slides downwards relative to the contact surface during the period from the first time to 1 s after the first time. Accordingly, the input operation analysis result is sliding the finger downwards.

When the input operation analysis result of sliding the finger downwards is obtained, the database of the electronic device can be searched for a control instruction corresponding to the input operation of downward sliding.

In the embodiment of the disclosure, the control instruction corresponding to the input operation of downward sliding is to decrease the volume of the electronic device. Therefore, when the electronic device obtains through analysis the input operation of sliding the finger downwards, it will decrease the volume of the electronic device.

On the other hand, supposing that positions $X_2$, $Y_2$, $Z_2$ and $S_2$ are above positions $X_1$, $Y_1$, $Z_1$ and $S_1$ respectively and positions $X_3$, $Y_3$, $Z_3$ and $S_3$ are above positions $X_2$, $Y_2$, $Z_2$ and $S_2$, then it can be determined, by analyzing the displacements of the feature points, that the finger slides upwards relative to the contact surface during the period from the first time to 1 s after the first time. Accordingly, the input operation analysis result is sliding the finger upwards. When the input operation analysis result of sliding the finger upwards is obtained, the database of the electronic device can also be searched for a control instruction corresponding to the input operation of upward sliding.

In the embodiment of the disclosure, the control instruction corresponding to the input operation of upward sliding is to increase the volume of the electronic device. Therefore, when the electronic device obtains through analysis the input operation of sliding the finger upwards, it will increase the volume of the electronic device.

In the second manner, three groups of texture information including fingerprints A and B are obtained during the period from the first time to 1 s after the first time as described above. Also, according to the texture information, feature points on fingerprints A and B are determined as points a, b, c and d.

In the first group of texture information, points a, b, c and d are located at positions $X_1$, $Y_1$, $Z_1$ and $S_1$ respectively; in the second group of texture information, points a, b, c and d are located at positions $X_1$, $Y_2$, $Z_2$ and $S_2$ respectively; in the third group of texture information, points a, b, c and d are located at positions $X_1$, $Y_3$, $Z_3$ and $S_3$ respectively.

Thus, the position of point a does not change (in practical operation, point a may also be located within a predetermined range from position $X_1$).

Supposing that positions $Y_2$, $Z_2$ and $S_2$ are below positions $Y_1$, $Z_1$ and $S_1$ respectively and positions $Y_3$, $Z_3$ and $S_3$ are below positions $Y_2$, $Z_2$ and $S_2$, then it can be determined, by analyzing the displacements of the feature points, that the finger rotates clockwise about point a during the period from the first time to 1 s after the first time. Accordingly, the input operation analysis result is rotating the finger clockwise. When the input operation analysis result of rotating the finger clockwise is obtained, the database of the electronic device can also be searched for a control instruction corresponding to the input operation of rotating clockwise.

In the embodiment of the disclosure, the control instruction corresponding to the input operation of rotating clockwise is to adjust the time indicated by a circle-shaped clock application in the electronic device forwards (i.e., in the clockwise direction). Therefore, when the electronic device obtains through analysis the input operation of rotating the finger clockwise, it will adjust the time indicated by the circle-shaped clock application in the electronic device forwards (i.e., in the clockwise direction).

On the other hand, supposing that positions $Y_2$, $Z_2$ and $S_2$ are above positions $Y_1$, $Z_1$ and $S_1$ respectively and positions $Y_3$, $Z_3$ and $S_3$ are above positions $Y_2$, $Z_2$ and $S_2$, then it can be determined, by analyzing the displacements of the feature points, that the finger rotates counterclockwise about point a during the period from the first time to 1 s after the first time. Accordingly, the input operation analysis result is rotating the finger counterclockwise. When the input operation analysis result of rotating the finger counterclockwise is obtained, the database of the electronic device can also be searched for a control instruction corresponding to the input operation of rotating counterclockwise.

In the embodiment of the disclosure, the control instruction corresponding to the input operation of rotating counterclockwise is to adjust the time indicated by the circle-shaped clock application in the electronic device backwards (i.e., in the counterclockwise direction). Therefore, when the electronic device obtains through analysis the input operation of rotating the finger counterclockwise, it will adjust the time indicated by the circle-shaped clock application in the electronic device backwards (i.e., in the counterclockwise direction).

In the third manner, three groups of texture information including fingerprints A and B are obtained during the period from the first time to 1 s after the first time as described above. Also, according to the texture information, feature points on fingerprints A and B are determined as points a, b, c and d.

In the first group of texture information, points a, b, c and d are located at positions $X_1$, $Y_1$, $Z_1$ and $S_1$ respectively; in the second group of texture information, point a disappears and points b, c and d are located at positions $Y_2$, $Z_2$ and $S_2$ respectively; in the third group of texture information, points a and b disappear and points c and d are located at positions $Z_3$ and $S_3$ respectively.

By analyzing displacements of feature points, it can be derived that, during the period from the first time to 1 s after the first time, the operating body performs a rolling operation whereby it is possible for points a and b to disappear sequentially as they leaves the sensing region of the sensing apparatus during the rolling operation.

Through analysis of the above information, it can determined that the finger rolls in a direction from point a to point b. In the embodiment of the disclosure, if point a is on the left of point b relative to the contact surface, then the rolling direction of the finger is determined as towards the right and the input operation analysis result is rolling to the right. When the input operation analysis result of rolling to the right is obtained, the database of the electronic device can also be searched for a control instruction corresponding to the input operation of rolling to the right.

In the embodiment of the disclosure, the control instruction corresponding to the input operation of rolling to the right is to go to the next page of an electronic book in the electronic device. Therefore, when the electronic device obtains through analysis the input operation of rolling the finger to the right, it will go to the next page of the electronic book in the electronic device.

On the other hand, if point a is on the right of point b relative to the contact surface, then the rolling direction of the finger is determined as towards the left and the input operation analysis result is rolling to the left. When the input operation analysis result of rolling to the left is obtained, the database of the electronic device can also be searched for a control instruction corresponding to the input operation of rolling to the left.

In the embodiment of the disclosure, the control instruction corresponding to the input operation of rolling to the left is to go to the previous page of the electronic book in the electronic device. Therefore, when the electronic device obtains through analysis the input operation of rolling the finger to the left, it will go to the previous page of the electronic book in the electronic device.

In view of the foregoing, in the technical solution according to the embodiment of the disclosure, it is possible to provide more than one operations that can trigger corresponding application functions without clicking and selecting them from a menu. In practical operation, an input operation performed by the operating body can be obtained through analysis, so that a control instruction corresponding to the input operation can be found by searching through the database on the electronic device or another electronic device and then executed by the electronic device. Accordingly, in the embodiment of the disclosure, by performing different input operations with the operating body, corresponding control functions can be realized respectively. In practical operation, the control functions can be set arbitrarily according to practical demands and are not enumerated here.

Fourth Embodiment

Figure 5:
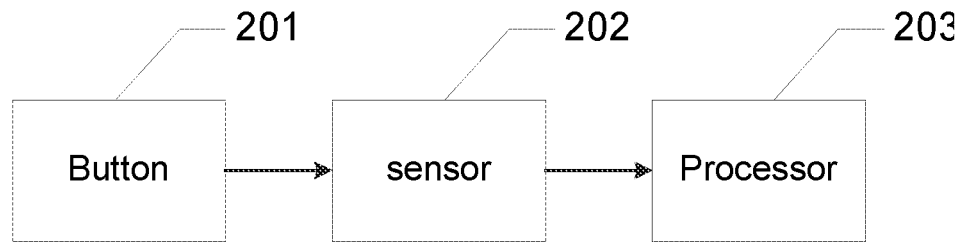
FIG. 5 is a structural diagram of an electronic device according to a fourth embodiment of the disclosure.

Referring to FIG. 5, the fourth embodiment of the disclosure provides an electronic device, comprising:

a button 201 comprising a contact surface which an operating body contacts;

a sensor 202 having a sensing region, which corresponds to the contact surface and is configured to obtain M pieces of texture information of the operating body, wherein M being an integer greater than or equal to 2; and a processor 203 configured to: determine, based on the M pieces of texture information, a changing trend of the M pieces of texture information, which indicates a change of operation in a first process of an input operation performed by the operating body on the contact surface; and determine a first input operation based on the changing trend.

Specifically, the processor 203 may be a general purpose central processing unit (CPU), an application specific integrated circuit (ASIC), or one or more integrated circuits for controlling execution of programs.

Further, the electronic device may also comprise one or more storages, which may include a read only memory (ROM), a random access memory (RAM) and a disk storage.

Specifically, the processor 203 is configured to: extract feature points for each of the M pieces of texture information, wherein the feature points for said each of the M pieces of texture information are different from each other; determine an area value for said each of the M pieces of texture information corresponding to the feature points; determine the changing trend, based on a change of the area value for said each of the M pieces of texture information in the first process. The changing trend may indicates a change of an operation force applied with respect to the contact surface in a process of an input operation performed by the operating body at a first position of the contact surface.

Alternatively, the processor 203 is configured to: extract feature points for each of the M pieces of texture information, wherein the feature points for said each of the M pieces of texture information are different from each other; and determine a moving direction of the operating body as a first direction, based on changes in position of the feature points for said each of the M pieces of texture information in the first process.

Alternatively, the processor 203 is configured to: extract feature points for each of the M pieces of texture information, wherein the feature points for said each of the M pieces of texture information are different from each other; determine a rolling direction of the operating body as a second direction, based on changes of the feature points for said each of the M pieces of texture information in the first process; and take the rolling direction determined as the second direction as the changing trend.

Alternatively, the electronic device further comprises a display screen, and the processor 203 is configured to respond to the first control instruction for adjusting a display parameter for a content displayed on the display screen.

Variants and detailed examples described above with respect to the information processing method embodiment illustrated in FIG. 4 also apply to the electronic device according to the embodiment. From the detailed description of the information processing method as set forth above, those skilled in the art can clearly know how to implement the electronic device according to the embodiment. For the sake of conciseness, detailed description is omitted here.

In viewing of the foregoing, according to the technical solution of the embodiment of the disclosure, it is possible to obtain M pieces of texture information of the operating body in the sensing region corresponding to the contact surface when the operating body performs an input operation on the contact surface of the first button of the electronic device, then determine a changing trend of the M pieces of texture information based on the M pieces of texture information, determine the input operation of the operating body based on the changing trend, and respond to a first control instruction corresponding to the input operation of the operating body. In this manner, the technical solution according to the embodiment of the disclosure enables provision of more operations for which corresponding application functions can be directly performed without having to click and select them from a menu. Accordingly, smartness and applicability of the electronic device are improved.

Fifth Embodiment

The fifth embodiment of the disclosure provides a preferred embodiment of an information processing method.

Figure 6:
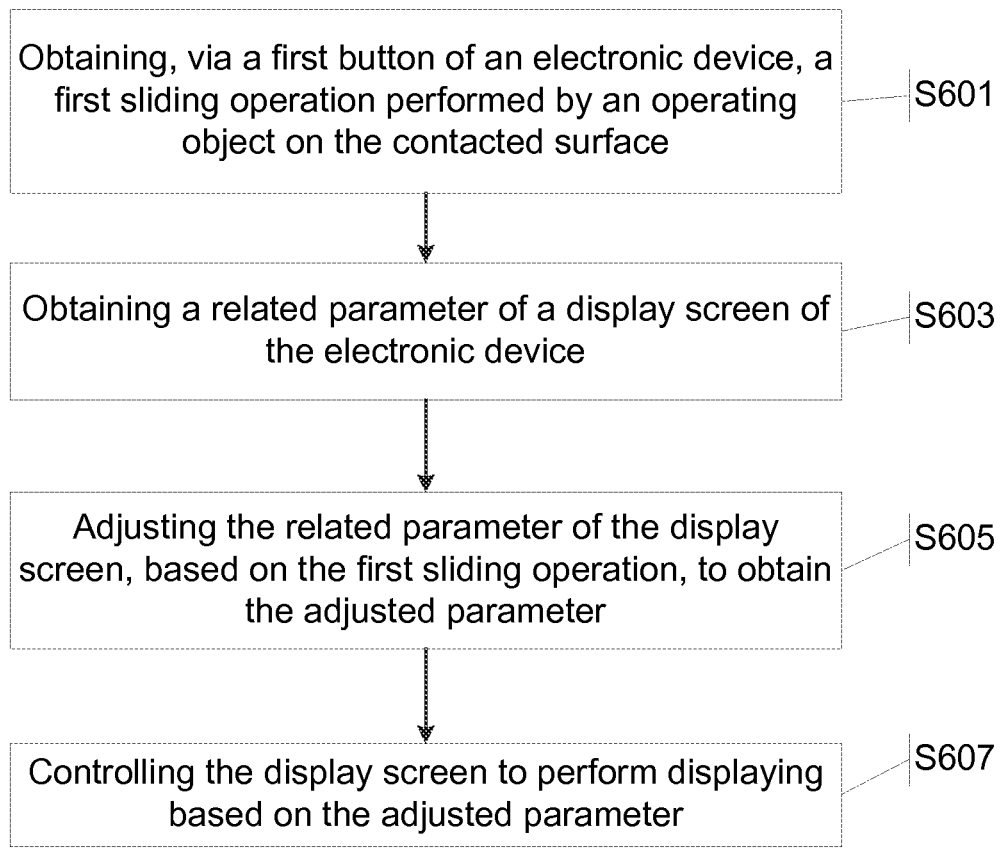
FIG. 6 is a flowchart of an information processing method according to a fifth embodiment of the disclosure.

As illustrated in FIG. 6, the method comprises:

at step S601, obtaining, via a first button of an electronic device, a first sliding operation performed by an operating body on a contact surface of the first button;

at step S603, obtaining a related parameter of a display screen of the electronic device;

at step S605, adjusting the related parameter of the display screen, based on the first sliding operation, to obtain the adjusted parameter;

at step S607, controlling the display screen to perform displaying based on the adjusted parameter.

Figure 7:
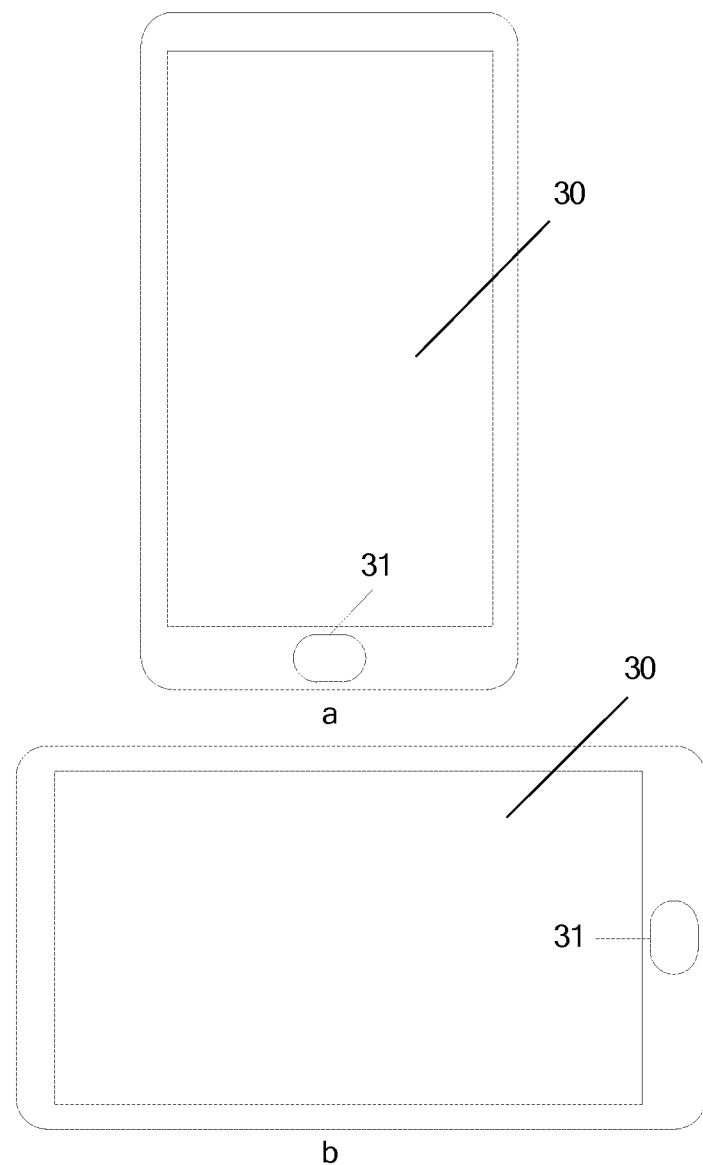
FIG. 7 is a schematic diagram of a first button in the fifth embodiment of the disclosure.

In step S601, the operating body may be a user's finger. The first button may be a hardware button on the electronic device which is arranged on a region outside the display screen. The first button has a contact surface. When the user's finger presses or slides on the contact surface, the first button can detect texture information of the finger. For example, when the electronic device is a smartphone, the first button is the home menu button (i.e., the Home button) of the smartphone, as illustrated in FIG. 7 which is a schematic diagram of the first button according to an embodiment of the disclosure. In detailed implementation, the first button may be square or circular and the disclosure is not limited in this regard.

In the embodiment of the disclosure, a fingerprint sensor may be integrated on the first button, so as to detect the first sliding operation by the fingerprint sensor. The fingerprint sensor can determine a direction in which the finger slides based on the detected texture information.

Specifically, firstly, M pieces of texture information in a process of the operating body performing an input operation on the contact surface are obtained via a sensing region on the contact surface of the first button of the electronic device, wherein M≥2 is an integer. Then, based on the M pieces of texture information, a changing trend of the M pieces of texture information is detected; and the first sliding operation is determined based on the changing trend.

As the finger slides on the contact surface, the pressure it applies on the contact surface varies. The contact region between the finger and the contact surface and the area of the contact region also change continuously. Accordingly, feature points may be extracted for each of at least two pieces of texture information acquired, and the feature points for each of the pieces of texture information are all different. Then, based on the features points for the M pieces of texture information, the changing trend is determined as moving in a first direction or in a second direction, wherein the changing trend indicates a movement of the operating body on the contact surface.

In detailed implementation, a texture identification result of the finger may be a texture image. When the finger is at different positions on the contact surface, the texture information detected by the electronic device is at different positions in the texture image accordingly. As the finger slides, multiple pieces of texture information are obtained sequentially. Then, the moving direction of the finger is determined, based on changes among positions of the multiple pieces of texture information in the texture image. For example, as the finger slides on the contact surface, two pieces of texture information of the finger are obtained: first texture information obtained at a first time; and second texture information obtained at a second time after the first time. If the second texture information is on the right of the first texture information in the fingerprint image, then it is determined that the finger slides from left to right. If the second texture information is on the left of the first texture information in the fingerprint image, then it is determined that the finger slides from right to left.

In the embodiment of the disclosure, the direction of the first sliding operation is described by taking a smartphone as an example. When the smartphone is in a portrait mode as illustrated in part a of FIG. 7, a left-right direction in which the finger slides may be set as the first direction, and a right-left direction in which the finger slides may be set as the second direction. When the smartphone is in a landscape mode as illustrated in part b of FIG. 7, a bottom-up direction in which the finger slides may be set as the first direction, and a top-down direction in which the finger slides may be set as the second direction. In detailed implementation, the first and second directions can be set by those skilled in the art according to a user's usage habits and are not limited herein.

After the first sliding operation is detected at step S601, step S603 is performed at which the related parameter of the display screen is obtained. Specifically, the related parameter of the display screen may be a display parameter of the display screen, such as brightness, contrast, etc. The related parameter of the display screen may also be a parameter for a display object displayed on the display screen, such as a parameter for an image, text or the like displayed on the display screen. The disclosure is not limited in this regard. For example, the related parameter of the display screen obtained at step S603 may be a display brightness parameter, which may take a value of 40.

Next, the electronic device performs step S605, at which the related parameter of the display screen is adjusted, based on the first sliding operation, to obtain the adjusted parameter. Specifically, for different sliding directions of the first sliding operation, the related parameter is adjusted in different manners.

Continuing with the above example, supposing that the display brightness parameter is 40, then the display brightness is increased and the display brightness parameter is increased to 60 when the first sliding operation indicates that the finger slides in the first direction, while the display brightness is decreased and the display brightness parameter is decreased to 20 when the first sliding operation indicates that the finger slides in the second direction. In detailed implementation, it is possible to set the amount of the increase/decrease of the display brightness parameter corresponding to one sliding operation. For example, the amount of the increase may be set as 10 or 20. The amount of the decrease may also be set as 10 or 20. Those skilled in the art may set the amount of the increase/decrease according to practical demands.

Next, the electronic device performs step S607, at which the display screen is controlled based on the adjusted parameter.

Continuing with the above example, supposing that the first sliding operation indicates that the finger slides in the first direction, then the display brightness parameter is increased from 40 to 60 and hence the adjusted parameter (i.e., the display brightness parameter) at step S607 is 60. If the first sliding operation indicates that the finger slides in the second direction, then the display brightness parameter is decreased from 40 to 20 and hence the adjusted parameter (i.e., the display brightness parameter) at step S607 is 20. In view of this, with the method according to the embodiment of the disclosure, a user can change the display brightness parameter of the display screen by performing a sliding operation on the first button instead of entering an interface for adjusting the display brightness parameter. As such, user operations are simplified and the electronic device becomes smarter. Likewise, other related parameters of the display screen may also be adjusted using the above method in order to simplify user operations.

In order to facilitate understanding of the disclosure by those skilled in the art, several detailed examples will be given in the following to illustrate the implementation of the information processing method according to the disclosure.

First Example

In the embodiment of the disclosure, step S603 may comprise: obtaining a current display brightness of the display screen, and obtaining an ambient brightness parameter of an environment where the display screen is located. Correspondingly, step S605 may comprise: adjusting the related parameter of the display screen based on the first sliding operation and the ambient brightness parameter. In other words, in the embodiment, the display brightness of the display screen can be adjusted based on the ambient brightness parameter. This is advantageous because it is difficult for a user to properly enter an interface for adjusting the display brightness using the display screen and to adjust the display brightness in case the ambient light intensity is high while the display brightness of the display screen is low.

In the embodiment of the disclosure, supposing that the first sliding operation indicates that the finger slides in the first direction, if the ambient brightness parameter is greater than a first ambient brightness threshold and the current display brightness of the display screen is lower than a first brightness threshold, then the display brightness parameter may be increased from the current display brightness to a first display brightness. Here, the first ambient brightness threshold and the first brightness threshold are parameter values set in advance. Alternatively, the first sliding operation may also be a sliding operation of the finger in the second direction. In detailed implementation, settings can be specified by those skilled in the art according to a user's usage habits and are not limited herein.

By way of example, supposing that the first ambient brightness threshold is 70 and the first brightness threshold is 30, if the current display brightness parameter of the display screen is 25 which is lower than the first brightness threshold 30, then it indicates that the brightness of the display screen is low. If the ambient brightness parameter is 73 which is greater than the first ambient brightness threshold, then it indicates that the ambient brightness is high. In the case of the current ambient brightness parameter, it is difficult for a user to clearly see contents displayed on the display screen. Accordingly, the user cannot properly enter an interface for adjusting the display brightness using the display screen and thus cannot adjust the display brightness. Therefore, with the technical solution according to the embodiment of the disclosure, the user can increase the current display brightness to the first display brightness by performing a sliding operation from left to right or from right to left on the contact surface of the first button. For example, when the electronic device detects that the user inputs a sliding operation in the first direction through the first button, the current display brightness parameter of the display screen 25 is lower than the first brightness threshold 30 and the ambient brightness parameter 73 is greater than the first ambient brightness threshold 70, the electronic device will increase the display brightness of the display screen.

In detailed implementation, the electronic device may prestore a correspondence table, which records correspondence relationships between the ambient brightness parameters and the first display brightness. For example, when the ambient brightness parameter falls within a range, the first display brightness is 40. Thus, by looking up the correspondence table, the first display brightness can be determined based on the ambient brightness parameter. Alternatively, it is also possible for each ambient brightness parameter to correspond to the first display brightness. In practical application, other approaches may be employed to determine the first display brightness based on the ambient brightness parameter. The disclosure is not limited in this regard.

Second Example

In the embodiment of the disclosure, step S603 may comprise: obtaining a current display brightness of the display screen as the related parameter of the display screen. Correspondingly, step S605 may comprise: adjusting the related parameter of the display screen, based on the first sliding operation, to obtain the adjusted parameter. In other words, without having to entering an interface for adjusting the display brightness, the user can adjust the display brightness by performing a sliding operation simply.

In the embodiment of the disclosure, when the first sliding operation indicates that the finger slides in the first direction, the display brightness is increased from the current display brightness to a second display brightness. When the first sliding operation indicates that the finger slides in the second direction, the display brightness is decreased from the current display brightness to a third display brightness.

In detailed implementation, it is possible to set the amount of the increase/decrease of the display brightness parameter corresponding to one sliding operation. For example, the amount of the increase may be set as 10 or 20. The amount of the decrease may also be set as 10 or 20. Those skilled in the art may also specify adjusting manners corresponding to sliding directions according to practical demands. For example, when the first sliding operation indicates that the finger slides in the second direction, the corresponding adjusting manner may be decreasing the display brightness. Correspondingly, when the first sliding operation indicates that the finger slides in the first direction, the corresponding adjusting manner may be increasing the display brightness.

Third Example

In the embodiment of the disclosure, step S603 may comprise: obtaining a display parameter for a display object displayed on the display screen. In the embodiment of the disclosure, the display object may be text displayed on the display screen, and the display parameter may be a text color of the text.

Correspondingly, step S605 may comprise: adjusting the text color based on the first sliding operation. Specifically, when the first sliding operation indicates that the finger slides in the first direction, the text color is adjusted from a current text color to a first text color. For example, when the current text color is black, the first text color may be white and thus the text color is adjusted to white. In the embodiment of the disclosure, the text needs to be displayed using an inverted color of the current color, that is, the text is displayed in a color-inverted manner.

The color-inverted displaying may be performed based on a color correspondence table set in advance. For example, in the correspondence table, the inverted color of black may be white, and the inverted color of red may be green. Thus, when the color-inverted displaying is performed, the color to be displayed can be known by looking up the color correspondence table.

In a possible implementation, step S603 may further comprise: obtaining a background color of a background image displayed on the display screen. Correspondingly, step S605 may comprise: adjusting the text color based on the first sliding operation and the background color.

In the embodiment of the disclosure, firstly, a color difference between a current text color and a current background color is calculated. Specifically, the text color and the background color may be represented using RGB parameters, and the color difference is differences between RGB parameters of the text color and the background color. Further, when the color difference is lower than a color difference threshold, the text color is adjusted from the current text color to a first text color or the background color is adjusted from the current background color to a first background color.

For example, the current text color is black and the current background color is dark grey. Because the color difference between these two colors is small and is lower than the color difference threshold, the text color may be adjusted to white while keeping the background color unchanged. It is also possible to adjust the background color to white and keep the text color unchanged. Specifically, after the text color is adjusted to white, the text on the display screen looks clearer because the background color is dark grey. Likewise, after the background color is adjusted to white, the text on the display screen also looks clearer because the text color is black. As such, it is convenient for the user to view the text.

In another possible implementation, after the text is color inverted, the method further comprises: detecting, via the first button, a second sliding operation performed by the operating body; and then adjusting the text color from the first text color to the current text color. That is, after the text has been displayed in a color-inverted manner, the electronic device is controlled to quit the color-inverted displaying by performing the second sliding operation.

Specifically, when the first sliding operation indicates that the finger slides in the first direction, the second sliding operation may be in the same direction or in the opposite direction and the disclosure is not limited in this regard.

Further, in the embodiment of the disclosure, the change of the text color may be global. That is, the color of all characters on the display screen is changed. These characters may be characters on the home screen of the electronic device or characters in applications on the electronic device. The disclosure is not limited in this regard.

Sixth Embodiment

Figure 8:
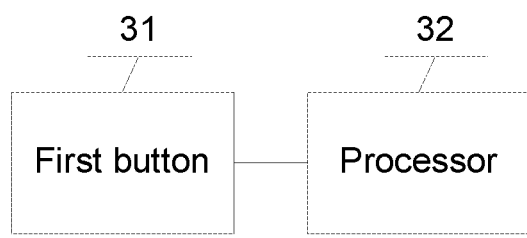
FIG. 8 is a block diagram illustrating a structure of an electronic device according to a sixth embodiment of the disclosure.

The sixth embodiment of the disclosure provides a preferred embodiment of an electronic device, which as illustrated in FIGS. 7 and 8 comprises:

a display screen 30;

a first button 31 configured to detect a first sliding operation performed by an operating body on a contact surface of the first button 31;

a processor 32 configured to: obtain a related parameter of the display screen 30 of the electronic device; adjust the related parameter of the display screen 30, based on the first sliding operation, to obtain the adjusted parameter; and control the display screen 30 to perform displaying based on the adjusted parameter.

Optionally, the first button 31 is configured to: obtain, via a sensing region on the contact surface of the first button 31 of the electronic device, M pieces of texture information in a process of the operating body performing an input operation on the contact surface, wherein M≥2 is an integer, and the processor 32 is configured to: based on the M pieces of texture information, determine a changing trend of the M pieces of texture information; and determine the first sliding operation based on the changing trend.

Optionally, the processor 32 is specifically configured to: extract feature points for each of the M pieces of texture information, wherein the feature points for said each of the M pieces texture information are different from each other; based on the feature points for the M pieces of texture information, determine whether the changing trend is moving in a first direction or moving in a second direction, wherein the changing trend indicates a movement of the operating body on the contact surface.

Optionally, the processor 32 is specifically configured to: obtain a current display brightness of the display screen 30 as the related parameter of the display screen 30.

Optionally, the processor 32 is further configured to:
obtain an ambient brightness parameter of an environment where the display screen 30 is located;
if the first sliding operation is a sliding operation in the first direction, the ambient brightness parameter is greater than a first ambient brightness threshold and the current display brightness is less than a first brightness threshold, increase the display brightness of the display screen 30 to a first display brightness.

Optionally, the processor 32 is specifically configured to:
if the first sliding operation is a sliding operation in the first direction, increase the display brightness of the display screen 30 to a second display brightness; and
if the first input operation is a sliding operation in the second direction, decrease the display brightness to a third display brightness.

Optionally, the processor 32 is specifically configured to: obtain a display parameter for a display object displayed on the display screen 30 as the related parameter of the display screen 30.

Optionally, the display object is text displayed on the display screen 30, and the display parameter is a text color of the text. The processor 32 is specifically configured to: when the first sliding operation is a sliding operation in the first direction, adjust the text color to a first text color.

The first text color may be different from the current text color.

Optionally, the display object is a background image and text displayed on the display screen 30, and the display parameter is a background color of the background image and a text color of the text.

The processor 32 is specifically configured to: calculate a color difference between the text color and the background color; if the first sliding operation is a sliding operation in the first direction and the color difference is less than a color difference threshold, adjust the text color to a first text color; or if the first sliding operation is a sliding operation in the first direction and the color difference is less than a color difference threshold, adjust the background color to a first background color.

Optionally, the first button 31 is further configured to: detect, via the first button 31, a second sliding operation performed by the operating body on the contact surface of the first button 31, after the text color is adjusted from the current texture color to the first text color.

The processor 32 is further configured to: adjust the text color from the first text color to the current text color.

Seventh Embodiment

Figure 9:
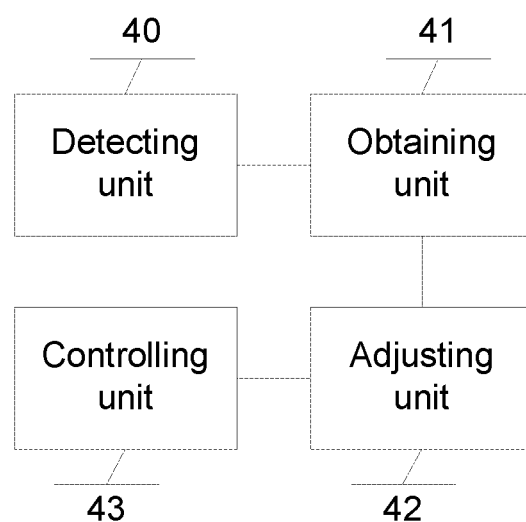
FIG. 9 is a block diagram illustrating a structure of an electronic device according to a seventh embodiment of the disclosure.

The seventh embodiment of the disclosure provides a preferred embodiment of an electronic device, which as illustrated in FIG. 9 comprises:
a detecting unit 40 configured to detect, via a first button of the electronic device, a first sliding operation performed by an operating body on a contact surface of the first button;
an obtaining unit 41 configured to obtain a related parameter of a display screen of the electronic device;
an adjusting unit 42 configured to adjust the related parameter of the display screen, based on the first sliding operation, to obtain the adjusted parameter;
a controlling unit 43 configured to control the display screen to perform displaying based on the adjusted parameter.

Optionally, the detecting unit 40 is specifically configured to:
obtain, via a sensing region on the contact surface of the first button of the electronic device, M pieces of texture information in a process of the operating body performing an input operation on the contact surface, wherein M≥2 is an integer;
determine a changing trend of the M pieces of texture information, based on the M pieces of texture information; and
determine the first sliding operation based on the changing trend.

Optionally, the detecting unit 40 is specifically configured to:
extract feature points for each of the M pieces of texture information, wherein the feature points for said each of the M pieces texture information are different from each other;
based on the feature points for the M pieces of texture information, determine whether the changing trend is moving in a first direction or a moving in a second direction, wherein the changing trend indicates a movement of the operating body on the contact surface.

Optionally, the obtaining unit 41 is specifically configured to: obtain a current display brightness of the display screen as the related parameter of the display screen.

Optionally, the obtaining unit 41 is further configured to: obtain an ambient brightness parameter of an environment where the display screen exists as the related parameter of the display screen.

The adjusting unit 42 is specifically configured to: if the first sliding operation is a sliding operation in the first direction, the ambient brightness parameter is greater than a first ambient brightness threshold and the current display brightness is less than a first brightness threshold, increase the display brightness of the display screen 30 to a first display brightness.

Optionally, the adjusting unit 42 is specifically configured to:
if the first sliding operation is a sliding operation in the first direction, increase the display brightness of the display screen to a second display brightness;
if the first input operation is a sliding operation in the second direction, decrease the display brightness to a third display brightness.

Optionally, the obtaining unit 41 is specifically configured to: obtain a display parameter for a display object displayed on the display screen as the related parameter of the display screen.

Optionally, the display object is text displayed on the display screen, and the display parameter is a text color of the text.

Optionally, the adjusting unit 42 is specifically configured to: if the first sliding operation is a sliding operation in the first direction, adjust the text color to a first text color.

Optionally, the display object is a background image and/or text displayed on the display screen, and the display parameter is a background color of the background image and/or a text color of the text.

The adjusting unit 42 is further configured to:
calculate a color difference between the text color and the background color;
when the first sliding operation is a sliding operation on the contact surface in the first direction and the color difference is less than a color difference threshold, adjust the text color from the current text color to a first text color and take the first text color as the adjusted parameter; or when the first sliding operation is a sliding operation on the contact surface in the first direction and the color difference is less than a color difference threshold, adjust the background color to a first background color.

Optionally, the detecting unit 40 is further configured to: detect, via the first button, a second sliding operation performed by the operating body on the contact surface of the first button, after the text color is adjusted to the first text color.

The adjusting unit 42 is further configured to: adjust the text color from the first text color to the current text color.

The electronic device according to the embodiment and the information processing method according to the fifth embodiment are two aspects based on the same inventive concept. From the detailed description of how to implement the method as set forth above, those skilled in the art can clearly know the structure of the electronic device and how to implement the electronic device. For the sake of conciseness, detailed description is omitted here.

As those skilled in the art will appreciate, the embodiments of the disclosure may be provided as methods, systems or computer program products. Thus, the disclosure may be embodied as pure hardware, pure software or a combination of software and hardware. In addition, the disclosure may be embodied as computer program products that are implemented on one or more computer-usable storage mediums (including but not limited to magnetic disk storage, CD-ROM, optical storage, etc.) containing computer-usable program codes.

The disclosure is described by referring to flowcharts and/or block diagrams of the methods, devices (systems) and computer program products according to the embodiments of the disclosure. It shall be understood that each flow and/or block in the flowcharts and/or block diagrams or a combination of flows and/or blocks in the flowcharts and/or block diagrams may be implemented by computer program instructions. These computer program instructions may be provided to a processor of a general-purpose computer, a specific-purpose computer, an embedded processing machine or some other programmable data processing device to create a machine, so that the instructions, which are executed by the processor of the computer or the programmable data processing device, create a device for realizing functions specified in one or more flows in the flowcharts and/or one or more blocks in the block diagrams.

The computer program instructions may also be stored in a computer-readable storage that can direct a computer or some other programmable data processing device to work in a specific manner, so that the instructions stored in the computer-readable storage create a manufactured article which comprises instruction means for realizing functions specified in one or more flows in the flowcharts and/or one or more blocks in the block diagrams.

The computer program instructions may also be loaded on a computer or some other programmable data processing device, so that a series of operations are executed on the computer or the programmable data processing device to generate computer-implemented processes. As such, the instructions executed on the computer or the programmable data processing device provide steps for realizing functions specified in one or more flows in the flowcharts and/or one or more blocks in the block diagrams.

To be specific, computer program instructions which correspond to the information processing method according to the embodiment of the disclosure may be stored on a storage medium such as an optical disc, a hard disk, a USB disk, etc. When the computer program instructions in the storage medium which correspond to the information processing method are read or executed by an electronic device, the following steps are performed:

detecting, via a sensing region of the electronic device, a first input operation performed by an operating body on a surface of a button of the electronic device;

comparing the first input operation with at least two predetermined operations in a preset database;

when the first input operation matches a first predetermined operation, determining a first control instruction corresponding to the first input operation; and performing a corresponding operation in response to the first control instruction.

Optionally, when the computer instructions stored in the storage medium which correspond to the step of detecting via the sensing region the first input operation on the surface of the button are executed, the following steps may be performed:

acquiring, via the button, M pieces of texture information generated by the operating body on the sensing region when the operating body is in contact with the surface of the button, M being an integer greater than or equal to 2;

determining, based on the M pieces of texture information, a changing trend of the M pieces of texture information, which indicates a change of operation in a first process of an input operation performed by the operating body on the contact surface; and determining the first input operation based on the changing trend.

Optionally, when the computer instructions stored in the storage medium which correspond to the step of determining based on the M pieces of texture information the changing trend of the M pieces of texture information are executed, the following steps may be performed:

extracting feature points for each of the M pieces of texture information, wherein the feature points for said each of the M pieces of texture information are different from each other;

determining an area value for said each of the M pieces of texture information corresponding to the feature points;

determining the changing trend, based on a change of the area value for said each of the M pieces of texture information in the first process.

Optionally, when the computer program instructions in the storage medium which correspond to the information processing method are read or executed by an electronic device, the following step may be performed:

if the first input operation matches a sliding operation in a first direction in the preset database, said performing the corresponding operation in response to the first control instruction comprises:

determining a switch instruction corresponding to the sliding operation in the first direction; and controlling, in response to the switch instruction, a display screen of the electronic device to switch from a first interface corresponding to a running state of a first application to a second interface corresponding to a running state of a second application.

Optionally, when the computer program instructions in the storage medium which correspond to the information processing method are read or executed by an electronic device, the following step is further performed:

the second application is an application being invoked by the electronic device before the first application is in a running state.

Optionally, when the computer program instructions in the storage medium which correspond to the information processing method are read or executed by an electronic device, the following steps are further performed:

after performing the corresponding operation in response to the first control instruction, detecting a second input operation through the sensing region of the electronic device;

generating a return instruction for controlling the display screen to switch from the second interface to the first interface, if the second input operation is different from the first input operation; and generating a switch instruction for controlling the display screen to switch from the second interface to a third interface which is corresponding to a running state of a third application, if the second input operation is the same as the first input operation.

Optionally, when the computer program instructions in the storage medium which correspond to the information processing method are read or executed by an electronic device, the following steps are further performed:

if the first input operation matches a sliding operation in the preset database, the first control application is used to adjust a display parameter for a content displayed on a display screen of the electronic device, and the performing the corresponding operation in response to the first control instruction comprises:

obtaining a related parameter of the display screen of the electronic device;

adjusting the related parameter of the display screen, based on the first input operation, to obtain an adjusted parameter; and controlling the display screen to display the content based on the adjusted parameter.

Optionally, when the computer instructions stored in the storage medium which correspond to the step of obtaining the related parameter of the display screen of the electronic device are executed, the following steps may be performed:

obtaining an ambient brightness parameter of an environment where the display screen is located;

said adjusting the related parameter of the display screen based on the first input operation comprises:

increasing a display brightness value of the display screen to a first brightness value, if the first input operation is a sliding operation in a first direction, the ambient brightness parameter is greater than a first ambient brightness threshold and the display brightness value of the display screen is less than a first display brightness threshold, or increasing a display brightness value of the display screen to a second brightness value, if the first input operation is a sliding operation in a first direction; and decreasing the display brightness value of the display screen to a third brightness value, if the first input operation is a sliding operation in a second direction.

Optionally, when the computer instructions stored in the storage medium which correspond to the step of obtaining the related parameter of the display screen of the electronic device are executed, the following steps may be performed:

obtaining a display parameter for a display object displayed on the display screen, wherein the display object includes text and the display parameter includes a text color of the text, and the adjusting the related parameter of the display screen based on the first input operation to obtain the adjusted parameter comprises: if the first input operation is a sliding operation in a first direction, adjusting the text color to a first text color.

Optionally, when the computer instructions stored in the storage medium which correspond to the step of obtaining the related parameter of the display screen of the electronic device are executed, the following steps may be performed:

obtaining a display parameter for a display object displayed on the display screen, wherein the display object includes a background image and text, and the display parameter includes a background color of the background image and a text color of the text, the adjusting the related parameter of the display screen based on the first input operation to obtain the adjusted parameter comprises:

calculating a color difference between the text color and the background color;

adjusting the text color to a first text color if the first input operation is a sliding operation in a first direction and the color difference is less than a color difference threshold, or adjusting the background color to a first background color if the first input operation is a sliding operation in the first direction and the color difference is less than a color difference threshold.

Optionally, when the computer instructions stored in the storage medium which correspond to the information processing method are executed, the following steps are further performed:

when the first input operation determined based on the changing trend matches a tapping operation in the preset database, obtaining a go-back instruction corresponding to the first predetermined operation and determining the go-back instruction as the first control instruction corresponding to the tapping operation, wherein the go-back instruction instructs a display screen of the electronic device to switch from a currently displayed fourth interface that is displayable when the first application runs to a fifth interface that is displayable when the first application runs, wherein the fourth interface is one level lower than the fifth interface.

Optionally, when the computer instructions stored in the storage medium which correspond to the information processing method are executed, the following steps are further performed:

the changing trend indicates a change of an operation force applied with respect to the contact surface in a process of the operating body performing an input operation at a first position on the contact surface, and in response to an increase or a decrease of the operation force, the control instruction corresponding to the first input operation is to enlarge or shrink a picture displayed in the display screen.

Although preferable embodiments of the disclosure have been described, those skilled in the art may make various alterations and changes to the embodiments upon realizing the fundament inventive concept. Therefore, the claims appended below are intended to be interpreted as encompassing the preferable embodiments as well as all alterations and changes that fall within the scope of the disclosure.

Obviously, those skilled in the art may make various alterations and changes to the disclosure without departing from the spirit and scope thereof. Thus, if these alterations and changes fall within the scope of the claims and the technical equivalents thereof, they are intended to be covered by the disclosure.

What is claimed is:

1. An information processing method, comprising:
   detecting, via a sensing region of an electronic device, a first input operation performed by an operating body on a surface of a button of the electronic device, wherein the operating body includes a finger, and the sensing region has a fingerprint recognition function;

matching the first input operation with at least two different types of predetermined operations in a preset database;
if the first input operation matches a first predetermined operation, determining a first control instruction corresponding to the first input operation;
performing a first operation on the electronic device in response to the first control instruction;
after performing the first operation in response to the first control instruction, detecting a second input operation through the sensing region of the electronic device;
comparing the second input operation with the first input operation;
generating a return instruction for revoking the first operation, if the second input operation is different from the first input operation; and
generating a continue instruction for continuing the first operation, if the second input operation is the same as the first input operation.

2. The method according to claim 1, wherein the determining, based on the M pieces of texture information, the changing trend of the M pieces of texture information comprises:
extracting the feature points for each of the M pieces of texture information, wherein the feature points for said each of the M pieces of texture information are different from each other;
determining the area value for said each of the M pieces of texture information corresponding to the feature points; and
determining the changing trend, based on a change of the area value for said each of the M pieces of texture information in the first process.

3. The method according to claim 1, wherein if the first input operation matches a sliding operation in a first direction in the preset database, said performing the corresponding operation in response to the first control instruction comprises:
determining a switch instruction corresponding to the sliding operation in the first direction; and
controlling, in response to the switch instruction, a display screen of the electronic device to switch from a first interface corresponding to a running state of a first application to a second interface corresponding to a running state of a second application.

4. The method according to claim 3, wherein the second application is an application being invoked by the electronic device before the first application is in a running state.

5. The method according to claim 1, wherein
if the first input operation matches a sliding operation in the preset database, said performing the corresponding operation in response to the first control instruction comprises:
obtaining a related parameter of the display screen of the electronic device;
adjusting the related parameter of the display screen, based on the first input operation, to obtain an adjusted parameter; and
controlling the display screen to display the content based on the adjusted parameter.

6. The method according to claim 5, wherein:
said obtaining the related parameter of the display screen of the electronic device comprises:
obtaining an ambient brightness parameter of an environment where the display screen is located;
said adjusting the related parameter of the display screen based on the first input operation comprises:
increasing a display brightness value of the display screen to a first brightness value, if the first input operation is a sliding operation in a first direction, the ambient brightness parameter is greater than a first ambient brightness threshold and the display brightness value of the display screen is less than a first display brightness threshold, or
increasing a display brightness value of the display screen to a second brightness value, if the first input operation is a sliding operation in a first direction; and decreasing the display brightness value of the display screen to a third brightness value, if the first input operation is a sliding operation in a second direction.

7. The method according to claim 5, wherein
the obtaining the related parameter of the display screen of the electronic device comprises:
obtaining a display parameter for a display object displayed on the display screen, wherein the display object includes text, and the display parameter includes a text color of the text, and
the adjusting the related parameter of the display screen based on the first input operation to obtain the adjusted parameter comprises: if the first input operation is a sliding operation in a first direction, adjusting the text color to a first text color.

8. The method according to claim 5, wherein
said obtaining the related parameter of the display screen of the electronic device comprises:
obtaining a display parameter for a display object displayed on the display screen, wherein the display object includes a background image and text, and the display parameter includes a background color of the background image and a text color of the text,
said adjusting the related parameter of the display screen based on the first input operation to obtain the adjusted parameter comprises:
calculating a color difference between the text color and the background color;
adjusting the text color to a first text color, if the first input operation is a sliding operation in a first direction and the color difference is less than a color difference threshold, or
adjusting the background color to a first background color, if the first input operation is a sliding operation in the first direction and the color difference is less than a color difference threshold.

9. The method according to claim 1, wherein
if the first input operation matches a tapping operation in the preset database according to the changing trend, said performing the corresponding operation in response to the first control instruction comprises:
determining a go-back instruction corresponding to the tapping operation; and
controlling, in response to the go-back instruction, a display screen of the electronic device to switch from a fourth interface corresponding to a running state of a first application to a fifth interface corresponding to a running state of the first application, wherein the fifth interface is an upper level interface of the fourth interface.

10. An electronic device, comprising:
a housing;
a button arranged at a first position of the housing and having a sensing region on a surface, the sensing region being configured to detect a first input operation performed by an operating body on the surface of the button, wherein the operating body includes a finger, and the sensing region has a fingerprint recognition function;
a storage unit storing executable instructions; and
a processor coupled to the storage unit to execute the instructions, the processor being configured to:
match the first input operation with at least two different types of predetermined operations in a preset database;
if the first input operation matches a first predetermined operation, determine a first control instruction corresponding to the first input operation;
perform a first operation on the electronic device in response to the first control instruction;
after performing the first operation in response to the first control instruction, detect a second input operation through the sensing region of the electronic device;
compare the second input operation with the first input operation;
generate a return instruction for revoking the first operation, if the second input operation is different from the first input operation; and
generate a continue instruction for continuing the first operation, if the second input operation is the same as the first input operation.

11. The electronic device according to claim 10, wherein the processor is configured to:
extract the feature points for each of the M pieces of texture information, wherein the feature points for said each of the M pieces of texture information are different from each other;
determine the area value for said each of the M pieces of texture information corresponding to the feature points; and
determine the changing trend, based on a change of the area value for said each of the M pieces of texture information in the first process.

12. The electronic device according to claim 10, wherein, if the first input operation matches a sliding operation in a first direction in the preset database, the processor is further configured to:
determine a switch instruction corresponding to the sliding operation in the first direction, and
control, in response to the switch instruction, a display screen of the electronic device to switch from a first interface corresponding to a running state of a first application to a second interface corresponding to a running state of a second application.

13. The electronic device according to claim 12, wherein the second application is an application being invoked by the electronic device before the first application is in a running state.

14. The electronic device according to claim 10, wherein if the first input operation matches a sliding operation in the preset database,
the processor is further configured to:
in response to the first control instruction, obtain a related parameter of the display screen of the electronic device;
adjust the related parameter of the display screen, based on the first input operation, to obtain an adjusted parameter, and
control the display screen to display the content based on the adjusted parameter.

15. The electronic device according to claim 14, wherein the processor is further configured to:
obtain an ambient brightness parameter of an environment where the display screen is located;
increase a display brightness of the display screen to a first display brightness if the first input operation is a sliding operation in a first direction, the ambient brightness parameter is greater than a first ambient brightness threshold and the display brightness value of the display screen is less than a first display brightness threshold, or
increase a display brightness value of the display screen to a second brightness value, if the first input operation is a sliding operation in a first direction; and decreasing the display brightness value of the display screen to a third brightness value, if the first input operation is a sliding operation in a second direction.

16. The electronic device according to claim 14, wherein the processor is further configured to:
obtain a display parameter for a display object displayed on the display screen, wherein the display object includes text, and the display parameter includes a text color of the text, and
if the first input operation is a sliding operation in a first direction, adjust the text color to a first text color.

17. The electronic device according to claim 14, wherein the processor is further configured to:
obtain a display parameter for a display object displayed on the display screen, wherein the display object includes a background image and text, and the display parameter includes a background color of the background image and a text color of the text, and
calculate a color difference between the text color and the background color;
if the first input operation is a sliding operation in a first direction and the color difference is less than a color difference threshold, adjust the text color to a first text color; or
if the first input operation is a sliding operation in the first direction and the color difference is less than a color difference threshold, adjust the background color to a first background color.

18. The electronic device according to claim 10, wherein, if the first input operation matches a tapping operation in the preset database according to the changing trend, the processor is further configured to:
determine a go-back instruction corresponding to the tapping operation; and
control, in response to the go-back instruction, a display screen of the electronic device to switch from a fourth interface corresponding to a running state of a first application to a fifth interface corresponding to a running state of the first application, wherein the fifth interface is an upper level interface of the fourth interface.

* * * * *